(12) United States Patent
Balassanian et al.

(10) Patent No.: US 12,205,565 B2
(45) Date of Patent: Jan. 21, 2025

(54) MUSIC GENERATOR GENERATION OF CONTINUOUS PERSONALIZED MUSIC

(71) Applicant: AiMi Inc., Austin, TX (US)

(72) Inventors: Edward Balassanian, Austin, TX (US); Patrick E. Hutchings, Melbourne (AU); Toby Gifford, Melbourne (AU)

(73) Assignee: AiMi Inc., Austin, TX (US)

( * ) Notice: Subject to any disclaimer, the term of this patent is extended or adjusted under 35 U.S.C. 154(b) by 743 days.

(21) Appl. No.: 17/408,105

(22) Filed: Aug. 20, 2021

(65) Prior Publication Data

US 2022/0059063 A1 Feb. 24, 2022

Related U.S. Application Data

(60) Provisional application No. 63/068,415, filed on Aug. 21, 2020, provisional application No. 63/068,421, (Continued)

(51) Int. Cl.
*G10H 1/00* (2006.01)
*G06N 20/00* (2019.01)
*G10H 1/053* (2006.01)

(52) U.S. Cl.
CPC ........... *G10H 1/0025* (2013.01); *G06N 20/00* (2019.01); *G10H 1/053* (2013.01);
(Continued)

(58) Field of Classification Search
CPC ................. G10H 1/0025; G10H 1/053; G10H 2210/031; G10H 2210/105;
(Continued)

(56) References Cited

U.S. PATENT DOCUMENTS

2008/0092721 A1* 4/2008 Schnepel ............. G10H 1/0025
84/609
2009/0132075 A1* 5/2009 Barry ..................... G11B 27/34
700/94

(Continued)

OTHER PUBLICATIONS

Smith, B. D., & Garnett, G. E. (Apr. 2012). Reinforcement learning and the creative, automated music improviser. In International Conference on Evolutionary and Biologically Inspired Music and Art (pp. 223-234). Springer, Berlin, Heidelberg.

(Continued)

*Primary Examiner* — Christina M Schreiber
(74) *Attorney, Agent, or Firm* — Kowert, Hood, Munyon, Rankin & Goetzel, P.C.; Gareth M. Sampson; Dean M. Munyon

(57) ABSTRACT

Techniques are disclosed relating to automatically generate new music content. In some embodiments, a computing system receivers user input specifying a user-defined music control element. The computing system may train a machine learning model to change both composition and performance parameters based on user adjustments to the user-defined music control element. In embodiments in which composition and performance subsystems are on different devices, one device may transmit configuration information to another device, where the configuration information specifies how to adjust parameters based on user input to the user-defined music control element. Disclosed techniques may facilitate centralized learning for human-like music production while allowing individualized customization for individual users. Further, disclosed techniques may allow artists to define their own abstract music controls and make those controls available to end-users.

20 Claims, 10 Drawing Sheets

Related U.S. Application Data filed on Aug. 21, 2020, provisional application No. 63/068,433, filed on Aug. 21, 2020, provisional application No. 63/068,431, filed on Aug. 21, 2020, provisional application No. 63/068,436, filed on Aug. 21, 2020, provisional application No. 63/068,411, filed on Aug. 21, 2020, provisional application No. 63/068,426, filed on Aug. 21, 2020.

(52) U.S. Cl.
CPC . *G10H 2210/031* (2013.01); *G10H 2210/105* (2013.01); *G10H 2210/111* (2013.01); *G10H 2220/116* (2013.01); *G10H 2240/125* (2013.01); *G10H 2240/131* (2013.01); *G10H 2240/141* (2013.01); *G10H 2240/325* (2013.01)

(58) Field of Classification Search
CPC ........ G10H 2210/111; G10H 2220/116; G10H 2240/125; G10H 2240/131; G10H 2240/141; G10H 2240/325; G06N 20/00
USPC .......................................................... 84/626
See application file for complete search history.

(56) References Cited

U.S. PATENT DOCUMENTS

| | | | | |
|---|---|---|---|---|
| 2014/0052282 | A1* | 2/2014 | Balassanian | G10H 1/0025 700/94 |
| 2015/0013528 | A1* | 1/2015 | Buskies | G10H 1/0066 84/611 |
| 2018/0219638 | A1* | 8/2018 | Arimoto | H04R 3/005 |
| 2019/0362696 | A1* | 11/2019 | Balassanian | G10H 1/0025 |
| 2020/0135237 | A1* | 4/2020 | Gauvin | G11B 27/036 |
| 2020/0168186 | A1* | 5/2020 | Yamamoto | G10F 1/08 |
| 2021/0027754 | A1* | 1/2021 | Balassanian | G06N 3/08 |
| 2021/0247955 | A1* | 8/2021 | Balassanian | G10L 25/06 |
| 2021/0248213 | A1* | 8/2021 | Balassanian | H04L 9/0637 |
| 2021/0248983 | A1* | 8/2021 | Balassanian | G06N 3/044 |
| 2021/0343262 | A1* | 11/2021 | Zavesky | H04L 63/12 |
| 2021/0390938 | A1* | 12/2021 | Morsy | G06F 3/0482 |
| 2022/0059062 | A1* | 2/2022 | Balassanian | G06N 3/042 |
| 2022/0059063 | A1* | 2/2022 | Balassanian | G06N 3/088 |
| 2023/0020181 | A1* | 1/2023 | Balassanian | G06F 16/68 |

OTHER PUBLICATIONS

Jaques et al., "Tuning recurrent neural networks with reinforcement learning," Under review as a conference paper at ICLR 2017; arXiv:1611.02796v3 [cs.LG] Dec. 7, 2016; 12 pages.

Jaques et al., "Generating Music by Fine-Tuning Recurrent Neural Networks with Reinforcement Learning," Deep Reinforcement Learning Workshop, NIPS (2016), 11 pages.

Chi et al., "A Reinforcement Learning Approach to Emotion-based Automatic Playlist Generation," 2010 International Conference on Technologies and Applications of Artificial Intelligence, Nov. 18-20, 2010, IEEE, pp. 60-65.

Eghbal-Zadeh et al. "I-Vectors for Timbre-Based Music Similarity and Music Artist Classification," 16th International Society for Music Information Retrieval Conference (ISMIR) (Oct. 2015) pp. 554-560.

Tsiros et al., "Towards a Human-Centric Design Framework for AI Assisted Music Production," NIME, Jul. 21-25, 2020, pp. 399-404.

Choi et al., "Towards Playlist Generation Algorithms Using RNNs Trained on Within-Track Transitions*," arXiv:1606.02096v1 [cs. AI] Jun. 7, 2016; ACM ISBN 978-1-4503-2138-9, 4 pages.

Kitahara et al., "An interactive music composition system based on autonomous maintenance of musical consistency," Proc. Sound and Music Computing (2011), 7 pages.

Herremans et al., "MorpheuS: generating structured music with constrained patterns and tension," IEEE Transactions on Affective Computing (2017), 10(4), 510-523.

Fiebrink, "Real-time human interaction with supervised learning algorithms for music composition and performance," Princeton University, Jan. 2011, entire document.

* cited by examiner

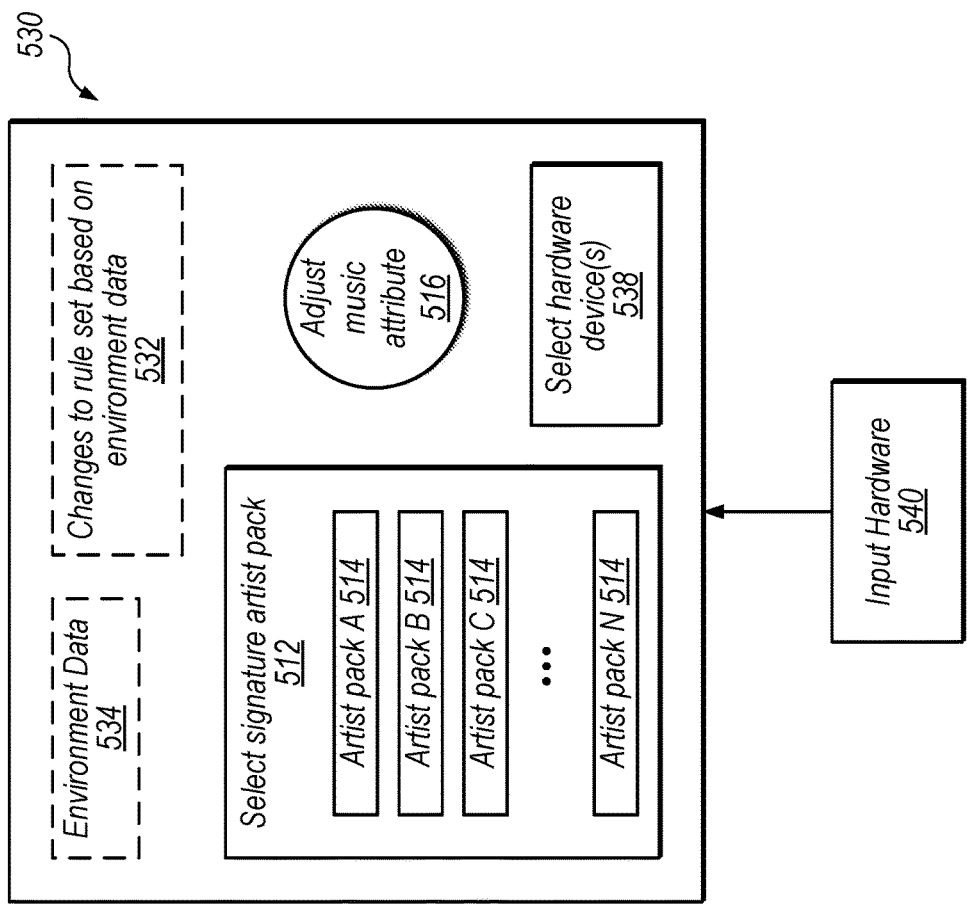
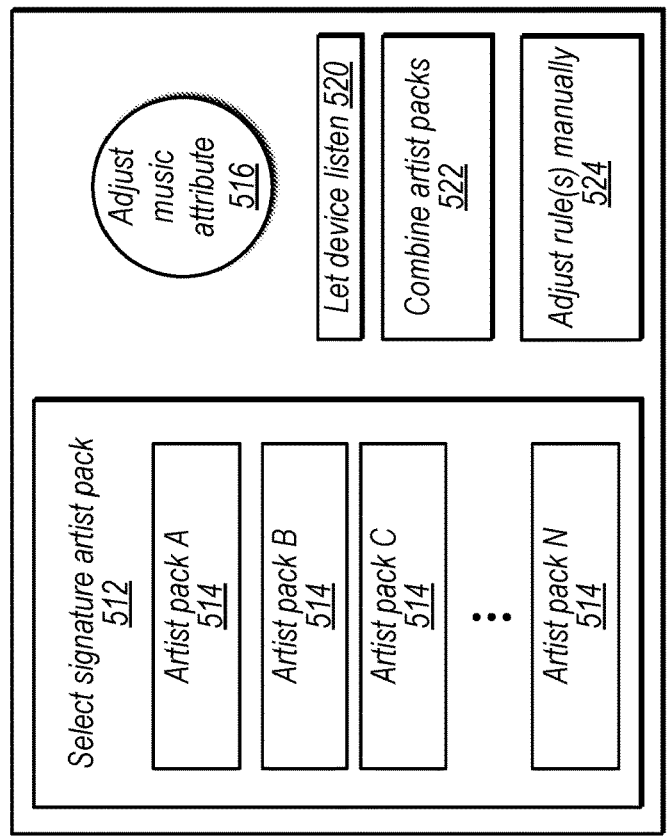
FIG. 5B
FIG. 5A

MUSIC GENERATOR GENERATION OF CONTINUOUS PERSONALIZED MUSIC

PRIORITY CLAIM

This application claims the benefit of U.S. Provisional Application No. 63/068,411, filed on Aug. 21, 2020; U.S. Provisional Application No. 63/068,415, filed Aug. 21, 2020; U.S. Provisional Application No. 63/068,421 filed Aug. 21, 2020; U.S. Provisional Application No. 63/068,426 filed Aug. 21, 2020; U.S. Provisional Application No. 63/068,431, filed Aug. 21, 2020; U.S. Provisional Application No. 63/068,433, filed Aug. 21, 2020; and U.S. Provisional Application No. 63/068,436 filed Aug. 21, 2020, each of which is incorporated by reference herein in its entirety.

BACKGROUND

Technical Field

This disclosure relates to audio engineering and more particularly to generating music content.

Description of the Related Art

Streaming music services typically provide songs to users via the Internet. Users may subscribe to these services and stream music through a web browser or application. Examples of such services include PANDORA, SPOTIFY, GROOVESHARK, etc. Often, a user can select a genre of music or specific artists to stream. Users can typically rate songs (e.g., using a star rating or a like/dislike system), and some music services may tailor which songs are streamed to a user based on previous ratings. The cost of running a streaming service (which may include paying royalties for each streamed song) is typically covered by user subscription costs and/or advertisements played between songs.

Song selection may be limited by licensing agreements and the number of songs written for a particular genre. Users may become tired of hearing the same songs in a particular genre. Further, these services may not tune music to users' tastes, environment, behavior, etc.

BRIEF DESCRIPTION OF THE DRAWINGS

FIGS. 5A-5B are block diagrams illustrating graphical user interfaces, according to some embodiments.

DETAILED DESCRIPTION

U.S. patent application Ser. No. 13/969,372, filed Aug. 16, 2013 (now U.S. Pat. No. 8,812,144), which is incorporated by reference herein in its entirety, discusses techniques for generating music content based on one or more musical attributes. To the extent that any interpretation is made based on a perceived conflict between definitions of the '372 application and the remainder of the disclosure, the present disclosure is intended to govern. The musical attributes may be input by a user or may be determined based on environment information such as ambient noise, lighting, etc. The '372 disclosure discusses techniques for selecting stored loops and/or tracks or generating new loops/tracks, and layering selected loops/tracks to generate output music content.

U.S. patent application Ser. No. 16/420,456, filed May 23, 2019 (now U.S. Pat. No. 10,679,596), which is incorporated by reference herein in its entirety, discusses techniques for generating music content. To the extent that any interpretation is made based on a perceived conflict between definitions of the '456 application and the remainder of the disclosure, the present disclosure is intended to govern. Music may be generated based on input by a user or using computer-implemented methods. The '456 disclosure discusses various music generator embodiments.

As used herein, the term "audio file" refers to sound information for music content. For instance, sound information may include data that describes music content in as raw audio in a format such as way, aiff, or FLAC. Properties of the music content may be included in the sound information. Properties may include, for example, quantifiable musical properties such as instrument classification, pitch transcription, beat timings, tempo, file length, and audio amplitude in multiple frequency bins. In some embodiments, an audio file includes sound information over a particular time interval. In various embodiments, audio files include loops. As used herein, the term "loop" refers to sound information for a single instrument over a particular time interval. Various techniques discussed with reference to audio files may also be performed using loops that include a single instrument. Audio files or loops may be played in a repeated manner (e.g., a 30 second audio file may be played four times in a row to generate 2 minutes of music content), but audio files may also be played once, e.g., without being repeated.

Figure 1:
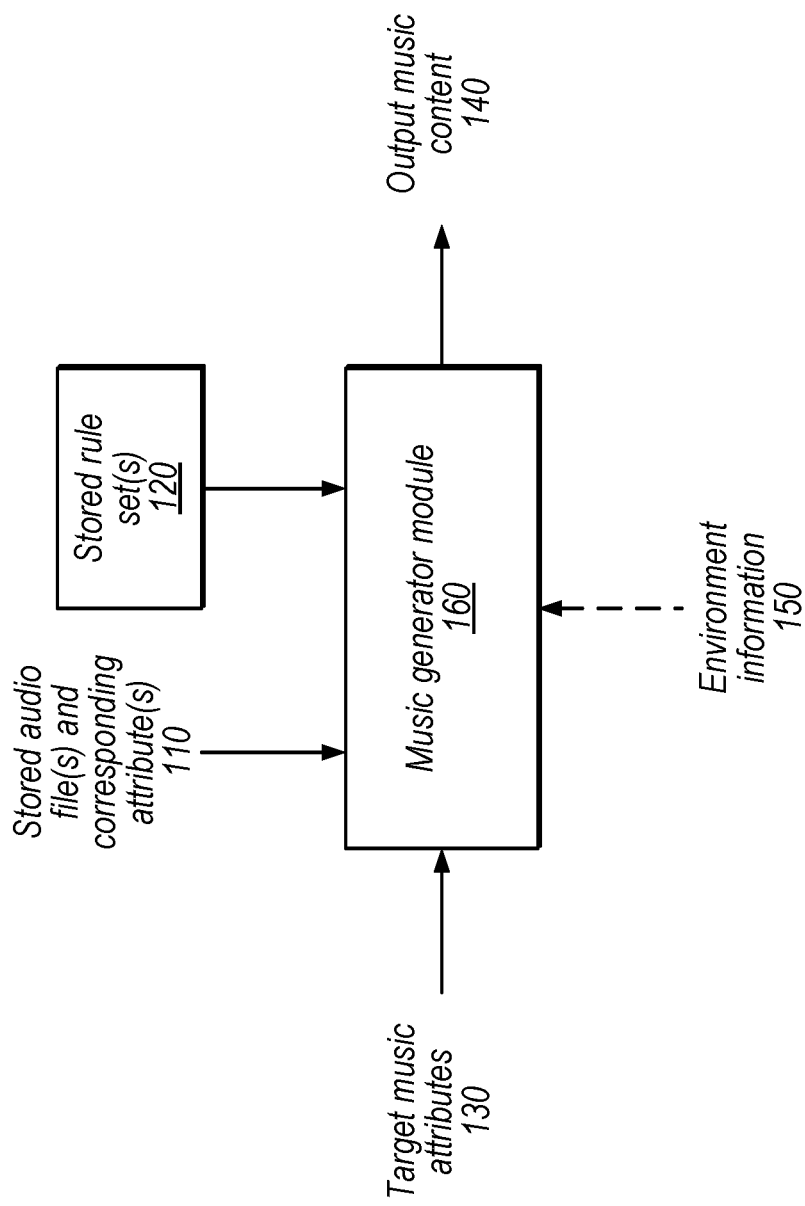
FIG. 1 is a diagram illustrating an exemplary music generator.
Figure 2:
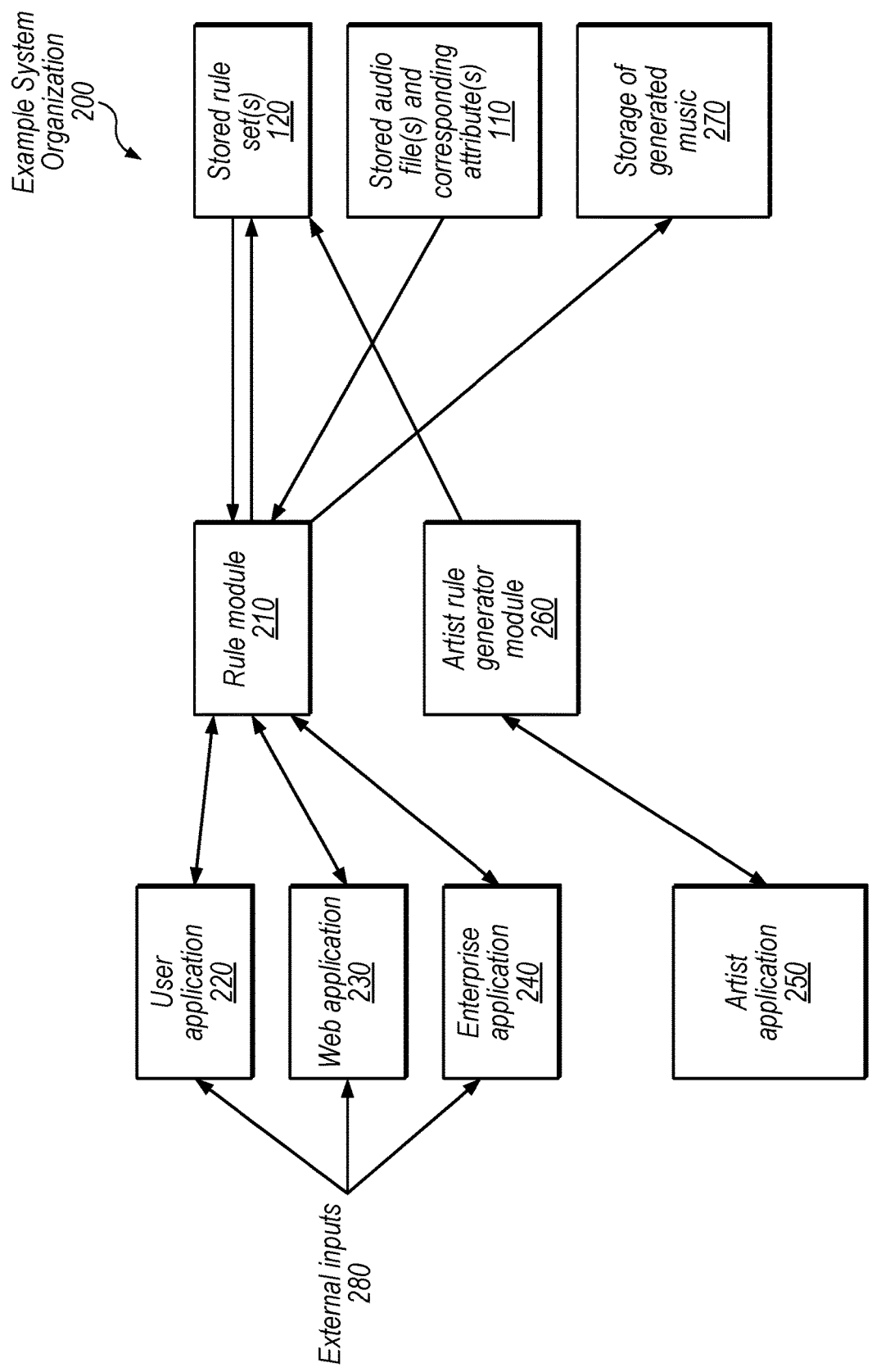
FIG. 2 is a block diagram illustrating an exemplary overview of a system for generating output music content based on inputs from multiple different sources, according to some embodiments.

This disclosure initially describes, with reference to FIGS. 1 and 2, an example music generator module and an overall system organization with multiple applications. Techniques for music generation are discussed with reference to FIGS. 3-4. FIGS. 5A-5B show exemplary application interfaces.

Generally speaking, the disclosed music generator includes audio files, metadata (e.g., information describing the audio files), and techniques for combining audio files based on the metadata. The generator may create music experiences using rules to identify the audio files based on metadata and target characteristics of the music experience. It may be configured to expand the set of experiences it can create by adding or modifying rules, audio files, and/or metadata. The adjustments may be performed manually (e.g., artists adding new metadata) or the music generator may augment the rules/audio files/metadata as it monitors the music experience within the given environment and goals/characteristics desired. For example, listener-defined controls may be implemented for gaining user feedback on music goals or characteristics.

Overview of Exemplary Music Generator

FIG. 1 is a diagram illustrating an exemplary music generator, according to some embodiments. In the illustrated embodiment, music generator module 160 receives various information from multiple different sources and generates output music content 140.

In the illustrated embodiment, module 160 accesses stored audio file(s) and corresponding attribute(s) 110 for the stored audio file(s) and combines the audio files to generate output music content 140. In some embodiments, music generator module 160 selects audio files based on their attributes and combines audio files based on target music attributes 130. In some embodiments, audio files may be selected based on environment information 150 in combination with target music attributes 130. In some embodiments, environment information 150 is used indirectly to determine target music attributes 130. In some embodiments, target music attributes 130 are explicitly specified by a user, e.g., by specifying a desired energy level, mood, multiple parameters, etc. For instance, listener-defined controls, described herein, may be implemented to specify listener preferences used as target music attributes. Examples of target music attributes 130 include energy, complexity, and variety, although more specific attributes (e.g., corresponding to the attributes of the stored tracks) may also be specified. Speaking generally, when higher-level target music attributes are specified, lower-level specific music attributes may be determined by the system before generating output music content.

Complexity may refer to the number of audio files, loops, and/or instruments that are included in a composition. Energy may be related to the other attributes or may be orthogonal to the other attributes. For example, changing keys or tempo may affect energy. However, for a given tempo and key, energy may be changed by adjusting instrument types (e.g., by adding high hats or white noise), complexity, volume, etc. Variety may refer to an amount of change in generated music over time. Variety may be generated for a static set of other musical attributes (e.g., by selecting different tracks for a given tempo and key) or may be generated by changing musical attributes over time (e.g., by changing tempos and keys more often when greater variety is desired). In some embodiments, the target music attributes may be thought of as existing in a multi-dimensional space and music generator module 160 may slowly move through that space, e.g., with course corrections, if needed, based on environmental changes and/or user input.

In some embodiments, the attributes stored with the audio files contain information about one or more audio files including: tempo, volume, energy, variety, spectrum, envelope, modulation, periodicity, rise and decay time, noise, artist, instrument, theme, etc. Note that, in some embodiments, audio files are partitioned such that a set of one or more audio files is specific to a particular audio file type (e.g., one instrument or one type of instrument).

In the illustrated embodiment, module 160 accesses stored rule set(s) 120. Stored rule set(s) 120, in some embodiments, specify rules for how many audio files to overlay such that they are played at the same time (which may correspond to the complexity of the output music), which major/minor key progressions to use when transitioning between audio files or musical phrases, which instruments to be used together (e.g., instruments with an affinity for one another), etc. to achieve the target music attributes. Said another way, the music generator module 160 uses stored rule set(s) 120 to achieve one or more declarative goals defined by the target music attributes (and/or target environment information). In some embodiments, music generator module 160 includes one or more pseudo-random number generators configured to introduce pseudo-randomness to avoid repetitive output music.

Environment information 150, in some embodiments, includes one or more of: lighting information, ambient noise, user information (facial expressions, body posture, activity level, movement, skin temperature, performance of certain activities, clothing types, etc.), temperature information, purchase activity in an area, time of day, day of the week, time of year, number of people present, weather status, etc. In some embodiments, music generator module 160 does not receive/process environment information. In some embodiments, environment information 150 is received by another module that determines target music attributes 130 based on the environment information. Target music attributes 130 may also be derived based on other types of content, e.g., video data. In some embodiments, environment information is used to adjust one or more stored rule set(s) 120, e.g., to achieve one or more environment goals. Similarly, the music generator may use environment information to adjust stored attributes for one or more audio files, e.g., to indicate target musical attributes or target audience characteristics for which those audio files are particularly relevant.

As used herein, the term "module" refers to circuitry configured to perform specified operations or to physical non-transitory computer readable media that store information (e.g., program instructions) that instructs other circuitry (e.g., a processor) to perform specified operations. Modules may be implemented in multiple ways, including as a hardwired circuit or as a memory having program instructions stored therein that are executable by one or more processors to perform the operations. A hardware circuit may include, for example, custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, or the like. A module may also be any suitable form of non-transitory computer readable media storing program instructions executable to perform specified operations.

As used herein, the phrase "music content" refers both to music itself (the audible representation of music), as well as to information usable to play music. Thus, a song recorded as a file on a storage medium (such as, without limitation a compact disc, flash drive, etc.) is an example of music content; the sounds produced by outputting this recorded file or other electronic representation (e.g., through speakers) is also an example of music content.

The term "music" includes its well-understood meaning, including sounds generated by musical instruments as well as vocal sounds. Thus, music includes, for example, instrumental performances or recordings, a cappella performances or recordings, and performances or recordings that include both instruments and voice. One of ordinary skill in the art would recognize that "music" does not encompass all vocal recordings. Works that do not include musical attributes such as rhythm or rhyme—for example, speeches, newscasts, and audiobooks—are not music.

One piece of music "content" can be distinguished from another piece of music content in any suitable fashion. For example, a digital file corresponding to a first song may represent a first piece of music content, while a digital file corresponding to a second song may represent a second piece of music content. The phrase "music content" can also be used to distinguish particular intervals within a given musical work, such that different portions of the same song can be considered different pieces of musical content. Similarly, different tracks (e.g., piano track, guitar track) within a given musical work may also correspond to different pieces of musical content. In the context of a potentially endless stream of generated music, the phrase "music content" can be used to refer to some portion of the stream (e.g., a few measures or a few minutes).

Music content generated by embodiments of the present disclosure may be "new music content"—combinations of musical elements that have never been previously generated. A related (but more expansive) concept—"original music content"—is described further below. To facilitate the explanation of this term, the concept of a "controlling entity" relative to an instance of music content generation is described. Unlike the phrase "original music content," the phrase "new music content" does not refer to the concept of a controlling entity. Accordingly, new music content refers to music content that has never before been generated by any entity or computer system.

Conceptually, the present disclosure refers to some "entity" as controlling a particular instance of computer-generated music content. Such an entity owns any legal rights (e.g., copyright) that might correspond to the computer-generated content (to the extent that any such rights may actually exist). In one embodiment, an individual that creates (e.g., codes various software routines) a computer-implemented music generator or operates (e.g., supplies inputs to) a particular instance of computer-implemented music generation will be the controlling entity. In other embodiments, a computer-implemented music generator may be created by a legal entity (e.g., a corporation or other business organization), such as in the form of a software product, computer system, or computing device. In some instances, such a computer-implemented music generator may be deployed to many clients. Depending on the terms of a license associated with the distribution of this music generator, the controlling entity may be the creator, the distributor, or the clients in various instances. If there are no such explicit legal agreements, the controlling entity for a computer-implemented music generator is the entity facilitating (e.g., supplying inputs to and thereby operating) a particular instance of computer generation of music content.

Within the meaning of the present disclosure, computer generation of "original music content" by a controlling entity refers to 1) a combination of musical elements that has never been generated before, either by the controlling entity or anyone else, and 2) a combination of musical elements that has been generated before, but was generated in the first instance by the controlling entity. Content type 1) is referred to herein as "novel music content," and is similar to the definition of "new music content," except that the definition of "novel music content" refers to the concept of a "controlling entity," while the definition of "new music content" does not. Content type 2), on the other hand, is referred to herein as "proprietary music content." Note that the term "proprietary" in this context does not refer to any implied legal rights in the content (although such rights may exist), but is merely used to indicate that the music content was originally generated by the controlling entity. Accordingly, a controlling entity "re-generating" music content that was previously and originally generated by the controlling entity constitutes "generation of original music content" within the present disclosure. "Non-original music content" with respect to a particular controlling entity is music content that is not "original music content" for that controlling entity.

Some pieces of music content may include musical components from one or more other pieces of music content. Creating music content in this manner is referred to as "sampling" music content, and is common in certain musical works, and particularly in certain musical genres. Such music content is referred to herein as "music content with sampled components," "derivative music content," or using other similar terms. In contrast, music content that does not include sampled components is referred to herein as "music content without sampled components," "non-derivative music content," or using other similar terms.

In applying these terms, it is noted that if any particular music content is reduced to a sufficient level of granularity, an argument could be made that this music content is derivative (meaning, in effect, that all music content is derivative). The terms "derivative" and "non-derivative" are not used in this sense in the present disclosure. With regard to the computer generation of music content, such computer generation is said to be derivative (and result in derivative music content) if the computer generation selects portions of components from pre-existing music content of an entity other than the controlling entity (e.g., the computer program selects a particular portion of an audio file of a popular artist's work for inclusion in a piece of music content being generated). On the other hand, computer generation of music content is said to be non-derivative (and result in non-derivative music content) if the computer generation does not utilize such components of such pre-existing content. Note some pieces of "original music content" may be derivative music content, while some pieces may be non-derivative music content.

It is noted that the term "derivative" is intended to have a broader meaning within the present disclosure than the term "derivative work" that is used in U.S. copyright law. For example, derivative music content may or may not be a derivative work under U.S. copyright law. The term "derivative" in the present disclosure is not intended to convey a negative connotation; it is merely used to connote whether a particular piece of music content "borrows" portions of content from another work.

Further, the phrases "new music content," "novel music content," and "original music content" are not intended to encompass music content that is only trivially different from a pre-existing combination of musical elements. For example, merely changing a few notes of a pre-existing musical work does not result in new, novel, or original music content, as those phrases are used in the present disclosure. Similarly, merely changing a key or tempo or adjusting a relative strength of frequencies (e.g., using an equalizer interface) of a pre-existing musical work does not produce new, novel, or original music content. Moreover, the phrases, new, novel, and original music content are not intended to cover those pieces of music content that are borderline cases between original and non-original content; instead, these terms are intended to cover pieces of music content that are unquestionably and demonstrably original, including music content that would be eligible for copyright protection to the controlling entity (referred to herein as "protectable" music content). Further, as used herein, the term "available" music content refers to music content that does not violate copyrights of any entities other than the controlling entity. New and/or original music content is often protectable and available. This may be advantageous in preventing copying of music content and/or paying royalties for music content.

Although various embodiments discussed herein use rule-based engines, various other types of computer-implemented algorithms may be used for any of the computer learning and/or music generation techniques discussed herein. Rule-based approaches may be particularly effective in the music context, however.

Overview of Applications, Storage Elements, and Data that May be Used in Exemplary Music Systems A music generator module may interact with multiple different applications, modules, storage elements, etc. to generate music content. For example, end users may install one of multiple types of applications for different types of computing devices (e.g., mobile devices, desktop computers, DJ equipment, etc.). Similarly, another type of application may be provided to enterprise users. Interacting with applications while generating music content may allow the music generator to receive external information that it may use to determine target music attributes and/or update one or more rule sets used to generate music content. In addition to interacting with one or more applications, a music generator module may interact with other modules to receive rule sets, update rule sets, etc. Finally, a music generator module may access one or more rule sets, audio files, and/or generated music content stored in one or more storage elements. In addition, a music generator module may store any of the items listed above in one or more storage elements, which may be local or accessed via a network (e.g., cloud-based).

FIG. 2 is a block diagram illustrating an exemplary overview of a system for generating output music content based on inputs from multiple different sources, according to some embodiments. In the illustrated embodiment, system 200 includes rule module 210, user application 220, web application 230, enterprise application 240, artist application 250, artist rule generator module 260, storage of generated music 270, and external inputs 280.

User application 220, web application 230, and enterprise application 240, in the illustrated embodiment, receive external inputs 280. In some embodiments, external inputs 280 include: environment inputs, target music attributes, user input, sensor input, etc. In some embodiments, user application 220 is installed on a user's mobile device and includes a graphical user interface (GUI) that allows the user to interact/communicate with rule module 210. In some embodiments, web application 230 is not installed on a user device, but is configured to run within a browser of a user device and may be accessed through a website. In some embodiments, enterprise application 240 is an application used by a larger-scale entity to interact with a music generator. In some embodiments, application 240 is used in combination with user application 220 and/or web application 230. In some embodiments, application 240 communicates with one or more external hardware devices and/or sensors to collect information concerning the surrounding environment.

Rule module 210, in the illustrated embodiment, communicates with user application 220, web application 230, and enterprise application 240 to produce output music content. In some embodiments, music generator 160 is included in rule module 210. Note that rule module 210 may be included in one of applications 220, 230, and 240 or may be installed on a server and accessed via a network. In some embodiments, applications 220, 230, and 240 receive generated output music content from rule module 210 and cause the content to be played. In some embodiments, rule module 210 requests input from applications 220, 230, and 240 regarding target music attributes and environment information, for example, and may use this data to generate music content.

Stored rule set(s) 120, in the illustrated embodiment, are accessed by rule module 210. In some embodiments, rule module 210 modifies and/or updates stored rule set(s) 120 based on communicating with applications 220, 230, and 240. In some embodiments, rule module 210 accesses stored rule set(s) 120 to generate output music content. In the illustrated embodiment, stored rule set(s) 120 may include rules from artist rule generator module 260, discussed in further detail below.

Artist application 250, in the illustrated embodiment, communicates with artist rule generator module 260 (which may be part of the same application or may be cloud-based, for example). In some embodiments, artist application 250 allows artists to create rule sets for their specific sound, e.g., based on previous compositions. This functionality is further discussed U.S. Pat. No. 10,679,596. In some embodiments, artist rule generator module 260 is configured to store generated artist rule sets for use by rule module 210. Users may purchase rule sets from particular artists before using them to generate output music via their particular application. The rule set for a particular artist may be referred to as a signature pack.

Stored audio file(s) and corresponding attribute(s) 110, in the illustrated embodiment, are accessed by module 210 when applying rules to select and combine tracks to generate output music content. In the illustrated embodiment, rule module 210 stores generated output music content 270 in storage element.

In some embodiments, one or more of the elements of FIG. 2 are implemented on a server and accessed via a network, which may be referred to as a cloud-based implementation. For example, stored rule set(s) 120, audio file(s)/attribute(s) 110, and generated music 270 may all be stored on the cloud and accessed by module 210. In another example, module 210 and/or module 260 may also be implemented in the cloud. In some embodiments, generated music 270 is stored in the cloud and digitally watermarked. This may allow detection of copying generated music, for example, as well as generating a large amount of custom music content.

In some embodiments, one or more of the disclosed modules are configured to generate other types of content in addition to music content. For example, the system may be configured to generate visual content based on target music attributes, determined environmental conditions, currently-used rule sets, etc. As another example, the system may search a database or the Internet based on current attributes of the music being generated and display a collage of images that dynamically changes as the music changes and matches the attributes of the music.

Exemplary Machine Learning Approaches

As described herein, music generator module 160, shown in FIG. 1, may implement a variety of artificial intelligence (AI) techniques (e.g., machine learning techniques) to generate output music content 140. In various embodiments, AI techniques implemented include a combination of deep neural networks (DNN) with more traditional machine learning techniques and knowledge-based systems. This combination may align the respective strengths and weaknesses of these techniques with challenges inherent in music composition and personalization systems. Music content has structure at multiple levels. For instance, a song has sections, phrases, melodies, notes and textures. Some machine learning techniques may be effective at analyzing and generating high level and low-level details of music content. For example, DNNs may be good at classifying the texture of a sound as belonging to a clarinet or an electric guitar at a low level or detecting verses and choruses at a high level. The middle levels of music content details, such as the construction of melodies, orchestration, etc. may be more difficult. DNNs are typically good at capturing a wide range of styles in a single model and thus, DNNs may be implemented as generative tools that have a lot of expressive range.

In some embodiments, music generator module 160 utilizes expert knowledge by having human-composed audio files (e.g., loops) as the fundamental unit of music content used by the music generator module. For example, social context of expert knowledge may be embedded through the choice of rhythms, melodies and textures to record heuristics in multiple levels of structure. Unlike the separation of DNN and traditional machine learning based on a structural level, expert knowledge may be applied in any areas where musicality can be increased without placing too strong of limitations on the trainability of music generator module 160.

In some embodiments, music generator module 160 uses DNNs to find patterns of how layers of audio are combined vertically, by layering sounds on top of each other, and horizontally, by combining audio files or loops into sequences. For example, music generator module 160 may implement an LSTM (long short-term memory) recurrent neural network, trained on MFCC (Mel-frequency cepstral coefficient) audio features of loops used in multitrack audio recordings. In some embodiments, a network is trained to predict and select audio features of loops for upcoming beats of music based on knowledge of the audio features of previous beats. For example, the network may be trained to predict the audio features of loops for the next 8 beats based on knowledge of the audio features of the last 128 beats. Thus, the network is trained to utilize a low-dimension feature representation to predict upcoming beats.

In certain embodiments, music generator module 160 uses known machine learning algorithms for assembling sequences of multitrack audio into musical structures with dynamics of intensity and complexity. For instance, music generator module 160 may implement Hierarchical Hidden Markov Models, which may behave like state machines that make state transitions with probabilities determined by multiple levels of hierarchical structure. As an example, a specific kind of drop may be more likely to happen after a buildup section but less likely if the end of that buildup does not have drums. In various embodiments, the probabilities may be trained transparently, which is in contrast to the DNN training where what is being learned is more opaque.

A Markov Model may deal with larger temporal structures and thus may not easily be trained by presenting example tracks as the examples may be too long. A feedback control element (such as a thumbs up/down on the user interface) may be used to give feedback on the music at any time. Correlations between the music structure and the feedback may then be used to update structural models used for composition, such as transition tables or Markov models. This feedback may also be collected directly from measurements of heart-rate, sales, or any other metric where the system is able to determine a clear classification. Expert knowledge heuristics, described above, are also designed to be probabilistic where possible and trained in the same way as the Markov model.

In certain embodiments, training may be performed by composers or DJs. Such training may be separate from listener training. For example, training done by listeners (such as typical users) may be limited to identifying correct or incorrect classification based on positive and negative model feedback, respectively. For composers and DJs, training may include hundreds of timesteps and include details on layers used and volume control to give more explicit detail into what is driving changes in music content. For example, training performed by composers and DJs may include sequence prediction training similar to global training of DNNs, described above.

In various embodiments, a DNN is trained to predict interactions a DJ might have with their audio interface at any moment in time given a sequence of the most recently played music. In some embodiments, these interactions may be recorded and used to develop new heuristics that are more transparent. In some embodiments, the DNN receives a number of previous measures of music as input and utilizes a low-dimension feature representation, as described above, with additional features that describe modifications to a track that a DJ or composer has applied. For example, the DNN may receive the last 32 measures of music as input and utilize the low-dimension feature representation along with additional features to describe modifications to the track that a DJ or composer has applied. These modifications may include adjustments to gain of a particular track, filters applied, delay, etc. For example, a DJ may use the same drum loop repeated for five minutes during a performance but may gradually increase the gain and delay on the track over time. Therefore, the DNN may be trained to predict such gain and delay changes in addition to loop selection. When no loops are played for a particular instrument (e.g., no drum loops are played), the feature set may be all zeros for that instrument, which may allow the DNN to learn that predicting all zeros may be a successful strategy, which may lead to selective layering.

In some instances, DJs or composers record live performances using mixers and devices such as TRAKTOR (Native Instruments GmbH). These recordings are typically captured in high resolution (e.g., 4 track recording or MIDI). In some embodiments, the system disassembles the recording into its constituent loops yielding information about the combination of loops in a composition as well as the sonic qualities of each individual loop. Training the DNN (or other machine learning) with this information provides the DNN with the ability to correlate both composition (e.g., sequencing, layering, timing of loops, etc.) and sonic qualities of loops to inform music generator module 160 how to create music experiences that are similar to the artists performance without using the actual loops the artist used in their performance.

Overview of Example Music Generation based on User-Defined Control Elements

Various techniques are disclosed for generating music content with interaction between composition and performance modules. Speaking generally, a composition subsystem may select and arrange audio files for composing music content while a performance subsystem may filter, add effects, mix, master, etc. to the selected audio files to generate output music content to actually be played.

In some disclosed embodiments, both the composition subsystem and the performance subsystem operate based on user input to music control elements (which may be shown via one or more user interfaces). As one example, an artist may provide user input to the composition subsystem (which may be implemented on a server system, for example) and an end user may provide user input to the performance subsystem (which may be implemented on a user device such as a mobile phone, for example). In other embodiments, the same user may provide input to both modules.

In some embodiments, the system allows users to define their own music controls and implements machine learning or other algorithms to adjust music parameters based on adjustments to the user-defined controls, which may be more abstract. For example, a user may define a "harmony," "happiness," or "moody" control and the composition subsystem may determine the type of lower-level parameters to adjust and the amount of adjustment to achieve the artist's vision for this control element. In some embodiments, all or a subset of the user-defined music controls are also available on the performance subsystem, e.g., so that users can implement artist-defined controls. In some embodiments, the two subsystems may communicate in order to provide proper performance parameters based on user-defined music controls. Disclosed techniques may advantageously allow artists to provide customized music control elements to end users. Further, disclosed techniques may allow centralized control of certain aspects of automatic music composition while still allowing end-users to customize real-time performance of generative music.

The subsets of music controls available to a composition subsystem and a performance system may or may not overlap. Further, users of the performance module may specify their own abstract music controls, which may be used in conjunction with abstract music controls defined by the composition module, in some embodiments.

Generally, disclosed techniques may facilitate the generation of more human-like music composition by a music generator system. The present inventors have recognized that providing abstract control over music generation allows the music generator system to generate music content according to stylistic, structural, or artistic preferences of the user.

Figure 3:
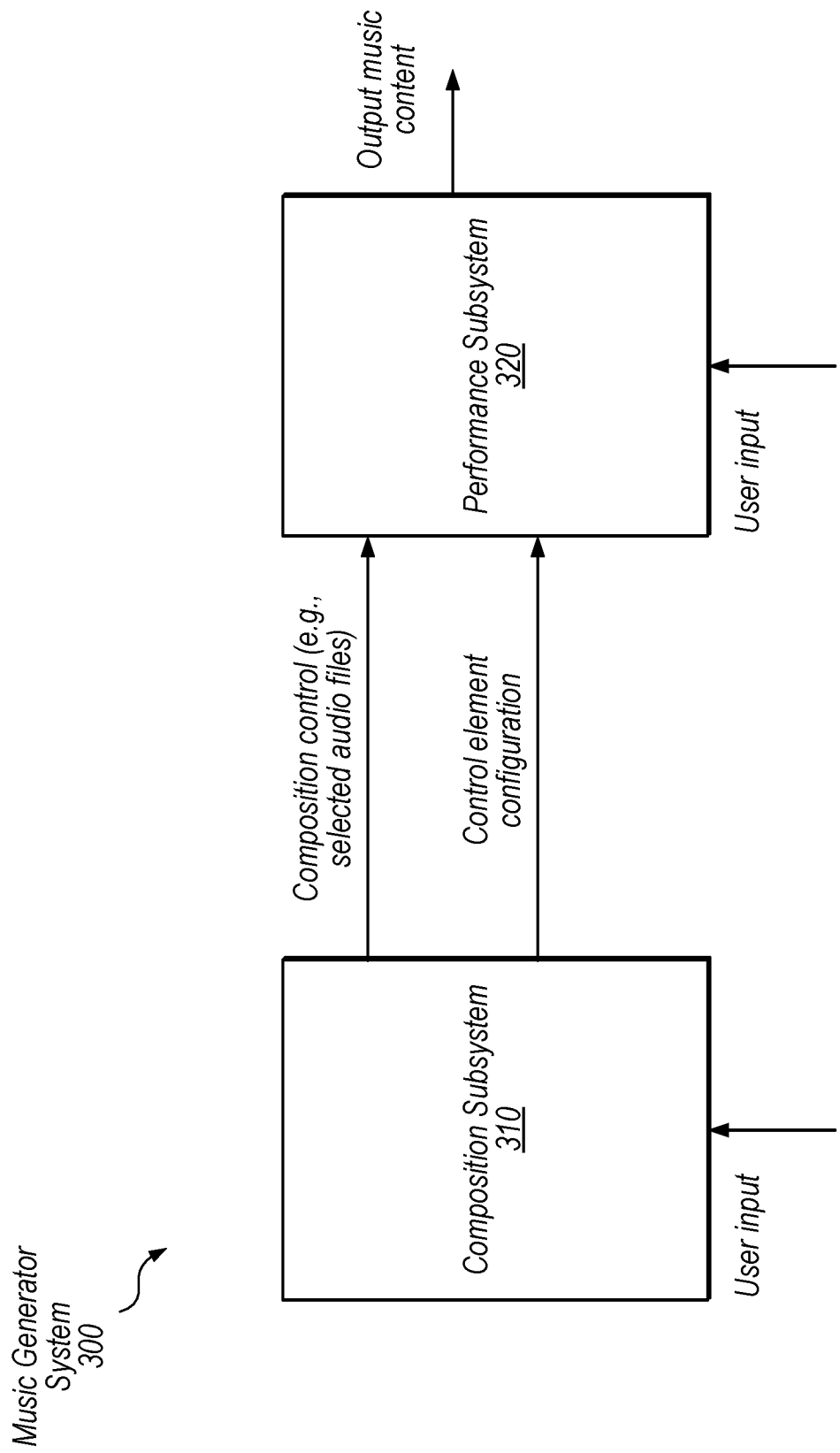
FIG. 3 is a block diagram illustrating an example music generator with a composition subsystem and a performance subsystem, according to some embodiments.

FIG. 3 is a block diagram illustrating an example music generator system 300 that includes a composition subsystem 310 and a performance subsystem 320, according to some embodiments.

Composition subsystem 310, in the illustrated embodiment, generates composition control output information based on user input. In some embodiments, the composition control output information identifies selected audio files to be combined and indicates their relative timing for inclusion in output music content. Composition subsystem 310 may determine how to arrange sections of music content and how and when to transition between sections, as discussed in further detail below.

In the illustrated embodiment, composition subsystem 310 also generates control element configuration signals for performance subsystem 320. In some embodiments, these signals configure performance subsystem 320 to implement user input to abstract music controls in an intended manner. For example, the configuration may specify how to adjust various performance operations (such as filtering, adding effects, mixing, mastering, etc.) based on adjustments to user-defined music controls.

As shown, composition subsystem 310 receives user input. This user input may specify custom music control elements, for example. The user input may also provide label information for previous compositions by a particular artist. For example, for the abstract control element "harmony," an artist may label previous compositions on a scale of 0 to N based on the artist's perception of their harmoniousness, to allow training of a machine learning model to adjust music composition parameters to reflect different levels of the harmony control element. Note that music control elements may have various encodings, including accepting user input that specifies specific values, increases/decreases, binary inputs such as good/bad, etc.

Performance subsystem 320, in the illustrated embodiment, is configured to generate output music content based on the composition control and control element configuration information from composition subsystem 310. As shown, performance sub-system 320 also receives user input, e.g., potentially for all of a subset of the music control elements implemented by composition subsystem 310 (performance subsystem 320 may also implement additional music control elements, in some embodiments). The set of control elements available for user input on the performance subsystem 320 is controlled by user input to composition subsystem 310, in some embodiments.

In various embodiments, composition control at multiple levels may advantageously provide musical outputs while allowing user customization for various music styles. Note that various functionality performed by the composition subsystem 310 in disclosed embodiments may be moved to performance subsystem 320 and vice versa, in other embodiments. The disclosed separation of functionality may provide good results in certain contexts, but is not intended to limit the scope of the present disclosure. Therefore, the composition control information of FIG. 3 may include various types of information ranging from raw selected audio files to at least partially-mixed output content, in various embodiments.

In some embodiments, composition subsystem 310 and performance subsystem 320 are implemented on different computer systems and communicate via a network. As discussed in detail below, communications between interfaces may use a custom string manipulation and storage technique to allow a real-time monitoring and control API (e.g., using the open sound control (OSC) protocol). In other embodiments, the subsystems are implemented on the same computer system.

Note that the performance subsystem 320 may also send control element configuration information to the composition subsystem 310 (not explicitly shown), e.g., in order for end-user adjustments to affect composition operations such as selecting audio files to be combined. Generally disclosed techniques may allow a user-defined control element defined on one device/interface to be available to users on other devices/interfaces and potentially control parameter adjustments on other subsystems or devices.

Detailed Example Music Generator with Composition and Performance Subsystems

Figure 4:
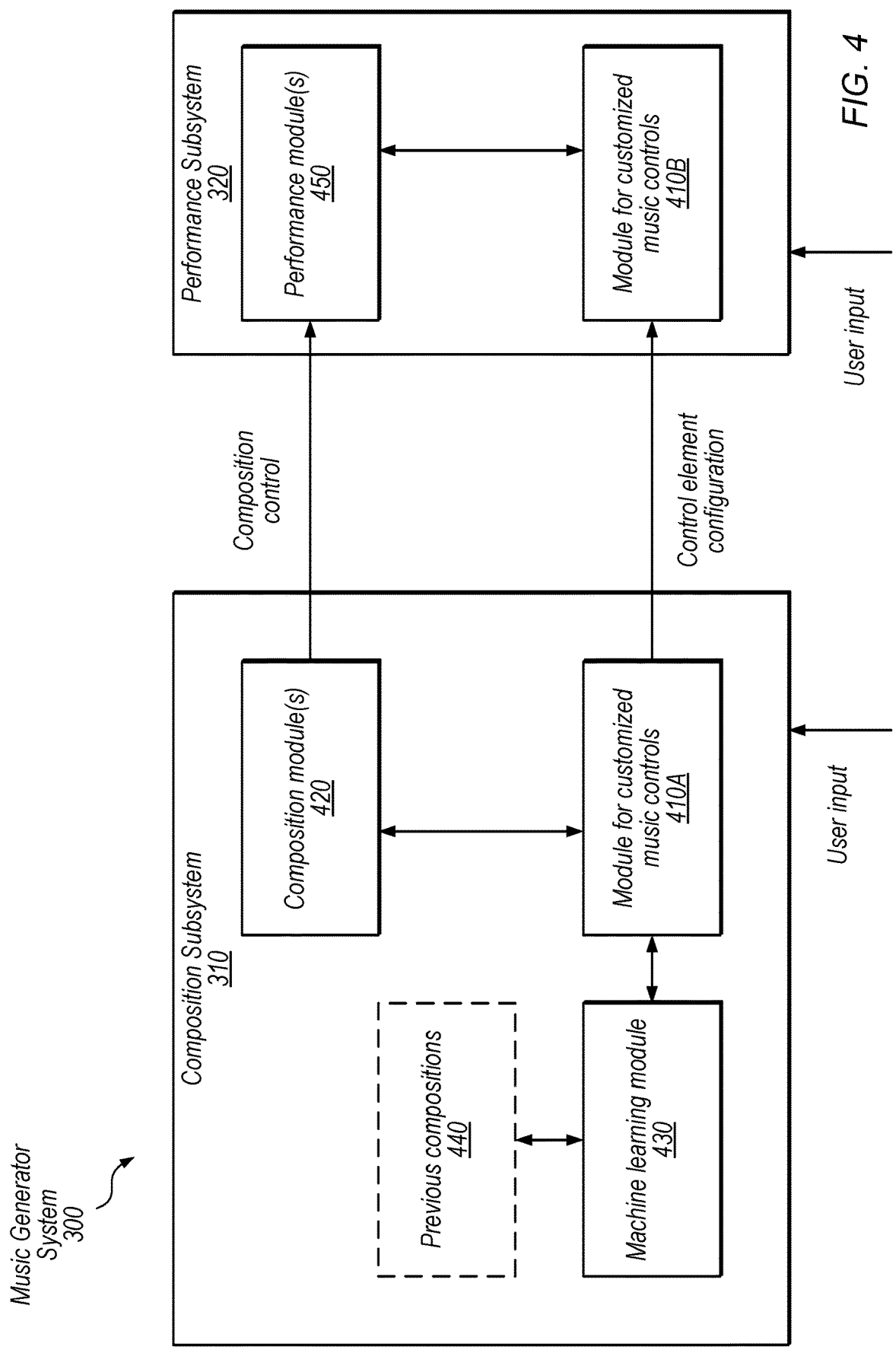
FIG. 4 is a block diagram illustrating more a detailed embodiment of the composition and performance subsystems, according to some embodiments.

FIG. 4 is a block diagram illustrating a more detailed example music generator system, according to some embodiments. In the illustrated embodiment, composition subsystem 310 includes a module for customized music controls 410A, composition module(s) 420, and machine learning module 430. In the illustrated embodiment, performance subsystem 320 includes a module for customized music controls 410B and performance module(s) 450. Note that more detailed examples of composition module(s) 420 and performance module(s) 450 included in different subsystems are discussed below with reference to FIG. 6.

Module 410A may communicate with machine learning module 430 based on user input to determine how to implement custom music controls using lower-level parameters. As shown, machine learning module 430 may access previous compositions 440 (which may be labeled as a whole or with labels for different portions, by the user, according to one or more custom music controls) to determine how to implement abstract controls using lower-level composition parameters (and these parameters may include parameters used by both subsystem 310 and subsystem 320). The training may use various appropriate machine learning models, e.g., deep neural networks, to determine the purpose of a user-specified control element. As shown, module 410A communicates control element configuration information to module 410B, which communicates with performance module(s) 450 to adjust performance parameters based on user input. Similarly, composition module(s) 420 adjust composition parameters based on signals from module 410A.

In some embodiments, artists may explicitly specify relationships between custom music controls and lower-level parameters. For example, for a "harmony" control, an artist may specify different parameters for creating tension (e.g., adding layers, riser effects, cutting a melody, etc.) for compositions with stronger harmonic movement than for compositions with lesser harmony. The explicit controls may be used alone or in combination with machine learning analysis to generate lower-level parameters, in some embodiments.

The following discussion sets out various parameters that may be indirectly controlled via custom user interface elements, e.g., based on machine learning or user indication of relationships between controls and parameters. Note that the music generator system may expose both abstract and lower-level controls, in some embodiments.

In some embodiments, the generation of continuous music is achieved through the combination of algorithmically defined musical sections and transitions. Sections may be defined by their musical function, e.g., building, sustaining and reducing tension. In some embodiments, sections of tension are created slowly by repetition of musical content, having a louder or more layered mix of sounds or playing contrasting musical rhythms or pitches over each other. In contrast, tension may be established quickly by defying listeners expectations. For example, ending a repeated phrase halfway through a repetition cycle, suddenly changing key, introducing a new texture that has not appeared previously in the music, sudden increases in volume, etc. may quickly establish tension. If the same technique for creating tension is repeated frequently, the listener may come to expect them and their effectiveness at creating tension is greatly diminished.

In some embodiments, tension is slowly released by reducing layers, aligning rhythms or pitches of previously contrasting sounds or ceasing the repetition of a musical phrase. Tension may be quickly released by returning to a previously established expectation such as resuming the repetition after the temporary suspension of an earlier phrase, resolving harmonic dissonance or providing a climax point marking the end of a section, for example a loud cymbal crash.

The creation of effective continuous music may result from sequencing the buildup and release of tension in diverse ways.

In some embodiments, composition subsystem 310 exposes certain controls with default or optional values. Controls may include gain mix, audio effects chain, musical arrangement over time, and concurrent layering of musical phrases, for example. Unlike a standard composition tools where only compositional processes that are added by the user have musical effect, in cases where an option value is not utilized, a machine learning algorithm may be used to affect compositional processes.

Examples of parameters controlled by composition subsystem 310 may include maximum repetition of a single loopable piece of audio, use of synthesized noise, and default EQ levels, for example. In some embodiments, the maximum repetition may be set as a hard limit or left at infinity, where there is no limit, but other composition processes are likely to drive departure from repetition without it. A "Synthesized noise" control could be used as a binary switch for enabling or disabling synthesized noise in some points of the composition, without controlling when it will be applied. The timing may be influenced by other controls and machine learning algorithms. The default EQ levels may allow a reference level for frequency, gain and bandwidth for 8 bands, which may be adjusted by other composition processes including those led by machine learning algorithms. The composition subsystem 310 may define which types of audio files can be used in different temporal structures of a composition without defining exactly when the temporal structures will take place in the composition.

Generally, various audio file categories, or 'groups' may be enabled or disabled within different musical arrangement structures. In some embodiments, a group being enabled means that it may be utilized by the subsystem but is not guaranteed to be. The following are examples of groups:

Beats: defines the rhythm bed, typically a drum-kit—unpitched

Bass: the bass line—pitched

Harmony: polyphonic mid-range that fleshes out the harmony—pitched

Pads: background soundscape or drone—pitched

Tops: extra rhythmic content, often percussion, typically syncopated—unpitched

Melody: mostly monophonic melody line—pitched

Pitched FX: extra sound effects with strong tonality—pitched

Unpitched FX: extra non-tonal sound effects e.g., noise—unpitched

For each of these groups there may be controls that are adjustable to set reference values for these qualities:

volume reverb amount delay punch probability delay wetness

In some embodiments, the following sections may be utilized: buildup: slow increase of tension; sustain: maintain the level of tension; drop: a climax point followed by low tension; breakdown: slow decrease of tension. Further, the following transitions may be utilized: Add layer: sudden tension increase; remove layer: sudden tension decrease; riser effects: fast tension increase; cut melody midway: fast tension increase. The composition subsystem 310 may learn how to apply various sections and transitions based on the composition preference of a particular artist of group of artists, for example.

In some embodiments, probability-based rules guide the sequence of transitions to encourage variations to the slow build and release of tension and transitions are used to create unexpected diversions in these slower trends. Excessive use of transitions may reduce the overall tension movement of the section they occupy, so maximum and minimum frequency of transitions may be scaled to section lengths.

The following table provides an example of transition probabilities for different sections. In some embodiments a user of the composition subsystem 310 modifies such a table to change the stepwise musical structure without predetermined absolute timing of sections:

| From\To | Intro | Buildup | Drop | Breakdown | Sustain |
|---|---|---|---|---|---|
| Intro | 0.0 | 1.0 | 0.0 | 0.0 | 0.0 |
| Buildup | 0.0 | 0.0 | 0.5 | 0.3 | 0.2 |
| Drop | 0.0 | 0.3 | 0.0 | 0.5 | 0.2 |
| Breakdown | 0.0 | 0.4 | 0.3 | 0.0 | 0.3 |
| Sustain | 0.0 | 1.0 | 0.0 | 0.0 | 0.0 |

In this example, transitioning from a breakdown section moves to a buildup section 40% of the time, to a drop section 30% of the time, and a sustain section 30% of the time.

The composition subsystem may further break sections down further to create a hierarchical structure of sections and subsections. Example subsections include:

Play only the first beat of a phrase and use delay with feedback to create a new rhythmic phrase for every melody or harmony loop.

Remove drum layers specifically.

Harmony loops are muted for 4 beats, every 8 beats.

Fade out the current bass line and gradually fade in a new bass line

Mute rhythmic layers for the last 8 beats of a subsection

A lowpass filter over all layers gradually reduces from 20,000 to 500 Hz

As each subsection produces transitions at their beginning, end and in some cases middle, certain subsections only occur in specific sections or at specific points of sections. As examples of subsection rules:

Subsections that remove beats don't occur at the start of Drop sections

Subsections that change basslines don't occur during Buildup sections

Subsections that remove any layer don't occur in sections were the total number of layers playing is less than 4 unless it is a Breakdown section The number and selection of layers used in each section may be determined to shape musical tension. Example layer combination include:

Intro: Bass and Drums throughout

Buildup: Bass and Drums throughout, gradual fade in of Percussion, Melody and Pads Drop: Bass, Drums, Percussion, Pads and Melody throughout Breakdown: Bass and Drums throughout, gradual fade out of all other layers Sustain: Same layers used at the end of the proceeding section In addition to subsections, brief musical deviations may be used to create variation and micro-tension that is particularly effective in loop-based, repeated music. For example, the following derivation techniques are used in some embodiments:

Delay-punch: the last or first beat of the drums is played again with a one or half beat delay without feedback.

A high-pass filter increases from 0 to 50 Hz over 8 beats and instantly dropped back to 0 hz to give a strong beat pulse Heavy reverb is applied to a single loop In some embodiments, subsections and deviations may be enabled or disabled in the composition subsystem, and in some cases may be parameterized. Therefore, speaking generally, the composition subsystem may provide users (e.g., artists) with control of more composition parameters relative to the performance subsystem.

Performance subsystem 320, in some embodiments, is configured to operate on the composition control information from the composition subsystem (e.g., a composition script) to generate output music content.

In some embodiments, composition subsystem 310 makes determinations by correlating feedback data mediated by performance subsystem 320 with music controls in the script. In addition to explicit thumb up/down feedback, for example, the act of playing the performance-control subsystem passively suggests a certain degree of preference. Retroactive analysis of compositions the user has consumed and feedback provided will help drive the machine learning systems to adjust both the represented loops on a user device and the composition techniques. The performance-control subsystem may use feedback analytics to find audio content of similar styles and attributes from its core set.

Just as an artist may style an artist pack with rules, heuristics, and training data, the performance-control subsystem may allow end users to accomplish the same with the set of loops that the performance subsystem provides. In this scenario, the performance subsystem may provide a large (and growing) set of loops for playback. The user may have inputs including thumbs up and down that would help the performance-control subsystem learn what types of loops and mixing techniques to use when creating soundscapes for them. In addition, UX controls may be provided to the user that will allow them more fine-grained control over the way the performance-control subsystem mixes content. This could include mixing levels, section length, complexity of music, use of mixing techniques such as builds and drops etc. These fine-tuning will essentially let a listener create their own "style" which the performance-control subsystem will use when creating soundscapes. Further, users may use their own custom control elements or custom control elements defined using module 410A for higher-level control over various composition aspects discussed below.

When a user selects thumbs up/down, many different elements of the current composition may be taken into account. These could include:

Current mixing levels such as gain for various layers

Attributes associated with loops around the time of the input

Environmental inputs such as time of day, weather, location, etc.

Explicit inputs through additional UX controls per above

These qualities may be captured by the performance subsystem and then associated with positive or negative feedback. Over time, this data will help guide the performance-control subsystem in training of machine learning module (not explicitly shown in FIG. 4) with positive and negative reinforcement, and may allow the performance-control subsystem to adjust parameters for music playback (e.g., parameters for the rules engine). The model used to adjust these parameters need not be relegated to a single user. For example, machine learning may be used to apply changes to composition and playback based on aggregate feedback on a music app. In other words, if a given user hits thumbs down and the pattern identified at this time matches a pattern many other users hit thumbs down on, then the system may adjust the music accordingly in the same way it did for the other users. This allows the performance-control subsystem to make personalized changes for users but nevertheless base them on aggregate data collected across many users.

Correlation of feedback with music properties may be mediated with measurements of the environment. In this way more nuanced models of user preference are constructed. For example, instead of "this listener likes these types of beats," the performance-control subsystem may learn "this listener likes these types of beats at this time of day, or when it is raining."

The success of personalization for end users may ultimately be measured by positive events associated with playback. These include events such as "thumbs up," playtime, etc. In addition to these events other parameters could be associated with successful personalization. For example, a restaurant playing the performance-control subsystem could associated growth in sales per hour as a metric for success. The performance-control subsystem may monitor the POS and associated positive changes in sales per hour with a positive reflection of the composition. In this manner the performance-control subsystem may implicitly train itself without needing explicit input. This model of training could be applied to any underlying set of loops since the training is as much about the composition of music as it is the exact loops being used.

Example Communication Techniques Between Composition and Performance Subsystems

In some embodiments, communications between subsystems implement real-time monitoring and control, e.g., using an API over OSC. Disclosed techniques discussed in detail below may facilitate real-time performance in such a context. Note that in distributed embodiments, the amount of data being sent over a network may become significant when monitoring all parameters and RMS levels—although still small compared to the full audio stream for example. Because these messages may be individually parsed, however, the string manipulations involved can become quite expensive. Creating such strings to be sent from a real-time thread may be performed with care, to reduce memory allocations and blocking calls.

OSC uses plain-text forward-slash delimited strings (similar to URLs) to address endpoints, for example "/master/compressor/threshold" or "/performance_module/effect_module/parameter_C." These strings may be used to route various information from composition module to the proper endpoint within performance_module, for example, and in the other direction, e.g., for monitoring purposes. The manipulation of delimited strings is thus a common operation in some embodiments—particularly functions analogous to 'split' and 'join' which convert between delimited strings and arrays of strings, as well as prepending and appending to a given delimited string.

Traditional string manipulation libraries implementing split/join etc., may not be designed with real-time operation in mind. In particular, their storage model typically creates copies of the component tokens when splitting a delimited string, for example. In order to reduce allocations, in some embodiments the disclosed the system uses a specialized DelimitedString container. The DelimitedString class may utilize the actual delimited string as a backing store, and expose a list—like API on top of that—essentially an array of pointer offsets into the fullstring that mark tokens. The backing string may be created with spare capacity on either side, so that additional tokens can be readily prepended/appended without requiring expensive reallocation.

The DelimitedString class may also be designed to allow efficient 'trimming' at either end. In these embodiments, the receiver of an OSC message (e.g., the performance subsystem 320) treats the OSC address as a hierarchical routing mechanism, and typically passes the message down through a chain of delegates lopping off the first token in the address at each stage. The DelimitedString may manage this efficiently by simply moving the "HEAD" pointer that references an offset into the fullstring backing store. It may also manage a state stack, to store a state, iteratively lop off parts of the address, then restore the state. This may allow for the same DelimitedString to be used over again.

Exemplary User and Enterprise GUIs

FIGS. 5A-5B are block diagrams illustrating graphical user interfaces, according to some embodiments. In the illustrated embodiment, FIG. 5A contains a GUI displayed by user application 510 and FIG. 5B contains a GUI displayed by enterprise application 530. In some embodiments, the GUIs displayed in FIGS. 5A and 5B are generated by a website rather than by an application. In various embodiments, any of various appropriate elements may be displayed, including one or more of the following elements: dials (e.g., to control volume, energy, etc.), buttons, knobs, display boxes (e.g., to provide the user with updated information), etc.

In FIG. 5A, user application 510 displays a GUI that contains section 512 for selecting one or more artist packs. In some embodiments, packs 514 may alternatively or additionally include theme packs or packs for a specific occasion (e.g., a wedding, birthday party, graduation ceremony, etc.). In some embodiments, the number of packs shown in section 512 is greater than the number that can be displayed in section 512 at one time. Therefore, in some embodiments, the user scrolls up and/or down in section 512 to view one or more packs 514. In some embodiments, the user can select an artist pack 514 based on which he/she would like to hear output music content. In some embodiments, artist packs may be purchased and/or downloaded, for example.

Selection element 516, in the illustrated embodiment, allows the user to adjust one or more music attributes (e.g., energy level). In some embodiments, selection element 516 allows the user to add/delete/modify one or more target music attributes. In various embodiments, selection element 516 may render one or more UI control elements (e.g., music controls 500).

Selection element 520, in the illustrated embodiment, allows the user to let the device (e.g., mobile device) listen to the environment to determine target musical attributes. In some embodiments, the device collects information about the environment using one or more sensors (e.g., cameras, microphones, thermometers, etc.) after the user selects selection element 520. In some embodiments, application 510 also selects or suggests one or more artist packs based on the environment information collected by the application when the user selected element 520.

Selection element 522, in the illustrated embodiment, allows the user to combine multiple artist packs to generate a new rule set. In some embodiments, the new rule set is based on the user selecting one or more packs for the same artist. In other embodiments, the new rule set is based on the user selecting one or more packs for different artists. The user may indicate weights for different rule sets, e.g., such that a highly-weighted rule set has more effect on generated music than a lower-weighted rule set. The music generator may combine rule sets in multiple different ways, e.g., by switching between rules from different rule sets, averaging values for rules from multiple different rule sets, etc.

In the illustrated embodiment, selection element 524 allows the user to adjust rule(s) in one or more rule sets manually. For example, in some embodiments, the user would like to adjust the music content being generated at a more granular level, by adjusting one or more rules in the rule set used to generate the music content. In some embodiments, this allows the user of application 510 to be their own disk jockey (DJ), by using the controls displayed in the GUI in FIG. 5A to adjust a rule set used by a music generator to generate output music content. These embodiments may also allow more fine-grained control of target music attributes.

In FIG. 5B, enterprise application 530 displays a GUI that also contains an artist pack selection section 512 with artist packs 514. In the illustrated embodiment, the enterprise GUI displayed by application 530 also contains element 516 to adjust/add/delete one or more music attributes. In some embodiments, the GUI displayed in FIG. 5B is used in a business or storefront to generate a certain environment (e.g., for optimizing sales) by generating music content. In some embodiments, an employee uses application 530 to select one or more artist packs that have been previously shown to increase sales (for example, metadata for a given rule set may indicate actual experimental results using the rule set in real-world contexts).

Input hardware 540, in the illustrated embodiment, sends information to the application or website that is displaying enterprise application 530. In some embodiments, input hardware 540 is one of the following: a cash register, heat sensors, light sensors, a clock, noise sensors, etc. In some embodiments, the information sent from one or more of the hardware devices listed above is used to adjust target music attributes and/or a rule set for generating output music content for a specific environment. In the illustrated embodiment, selection element 538 allows the user of application 530 to select one or more hardware devices from which to receive environment input.

Display 534, in the illustrated embodiment, displays environment data to the user of application 530 based on information from input hardware 540. In the illustrated embodiment, display 532 shows changes to a rule set based on environment data. Display 532, in some embodiments, allows the user of application 530 to see the changes made based on the environment data.

In some embodiments, the elements shown in FIGS. 5A and 5B are for theme packs and/or occasion packs. That is, in some embodiments, the user or business using the GUIs displayed by applications 510 and 530 may select/adjust/modify rule sets to generate music content for one or more occasions and/or themes.

Detailed Example Music Generator System

Figure 8:
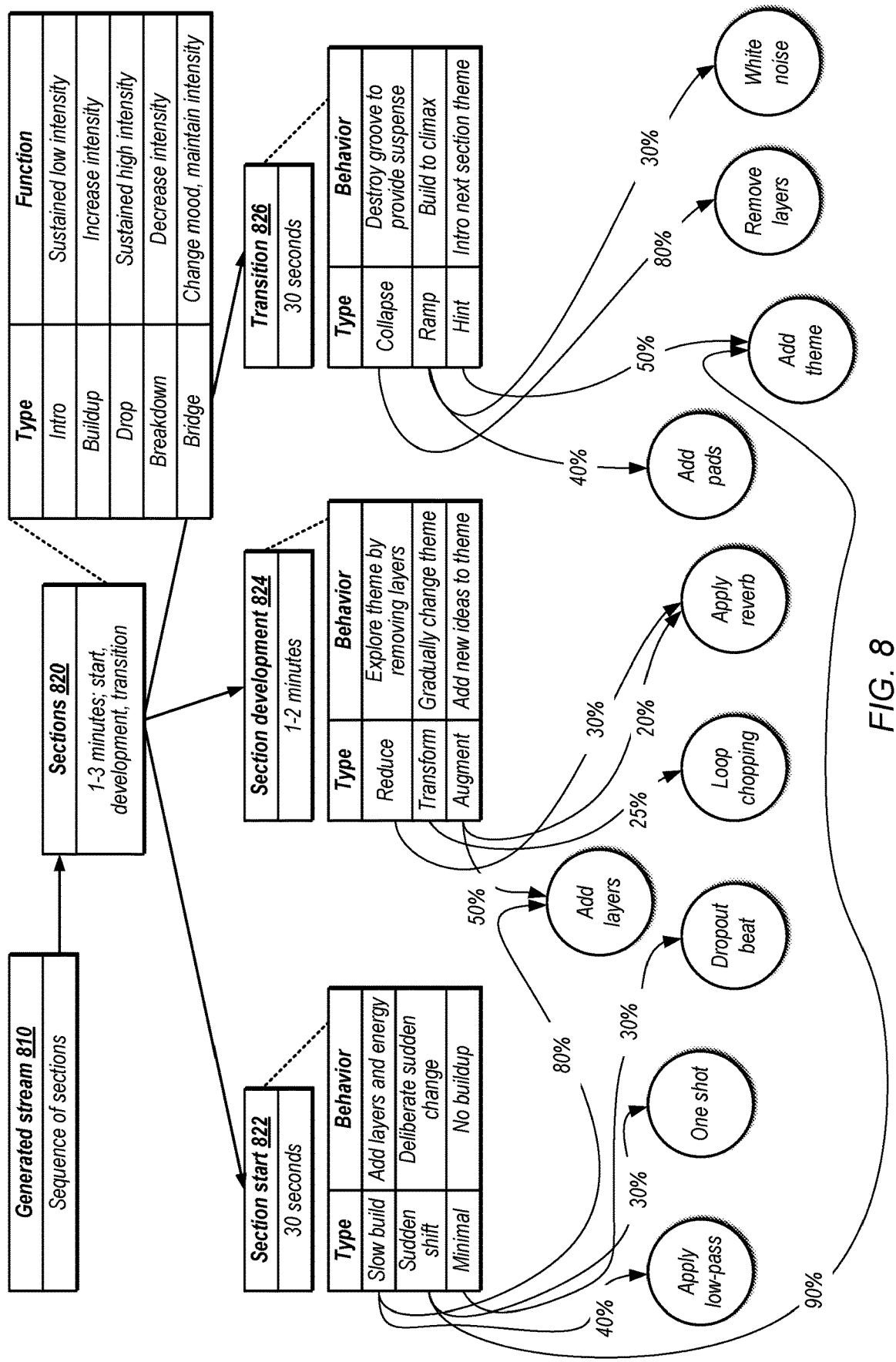
FIG. 8 is a diagram illustrating example techniques for arranging sections of music content, according to some embodiments.
Figure 9:
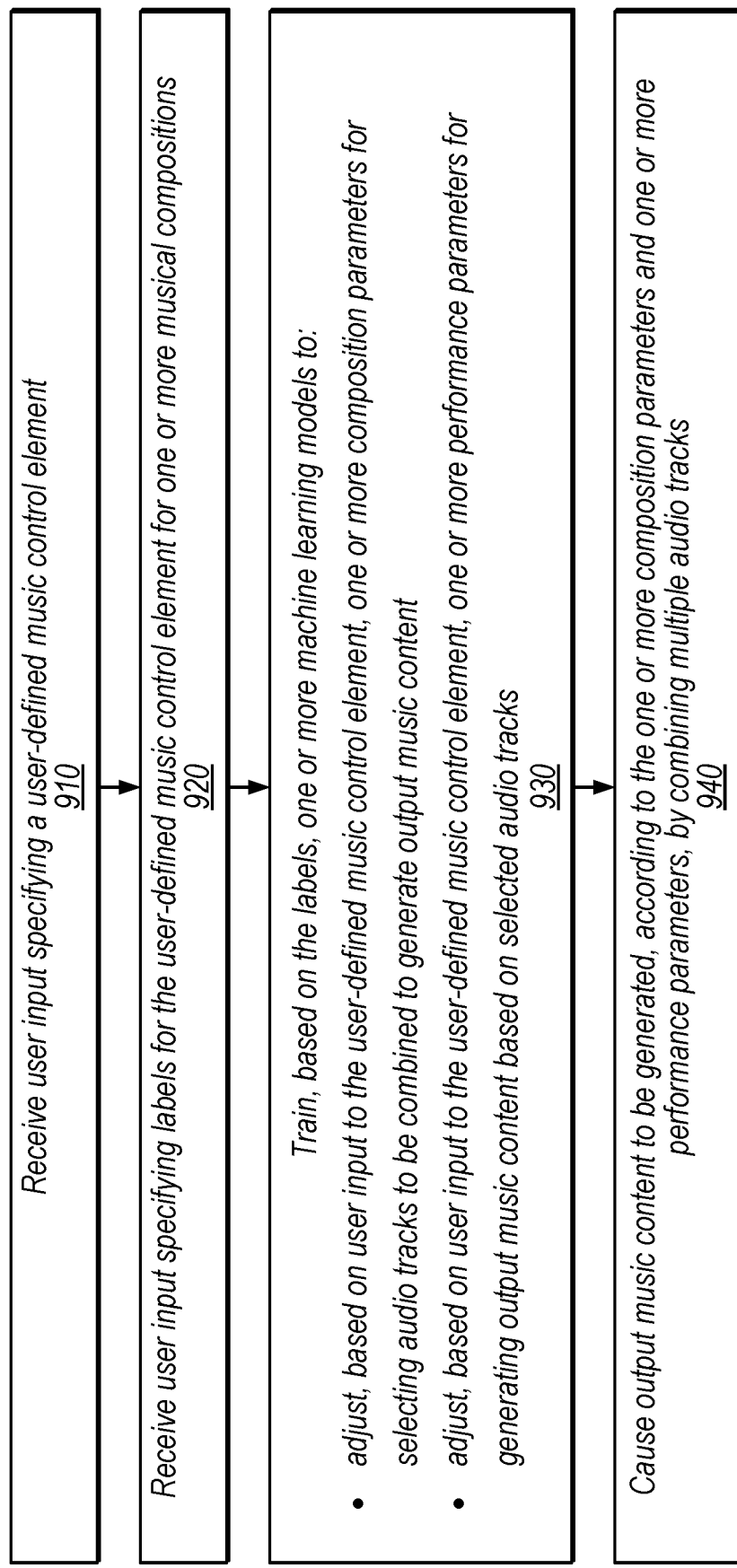
FIGS. 9 and 10 are flow diagrams illustrating example methods, according to some embodiments.
Figure 10:
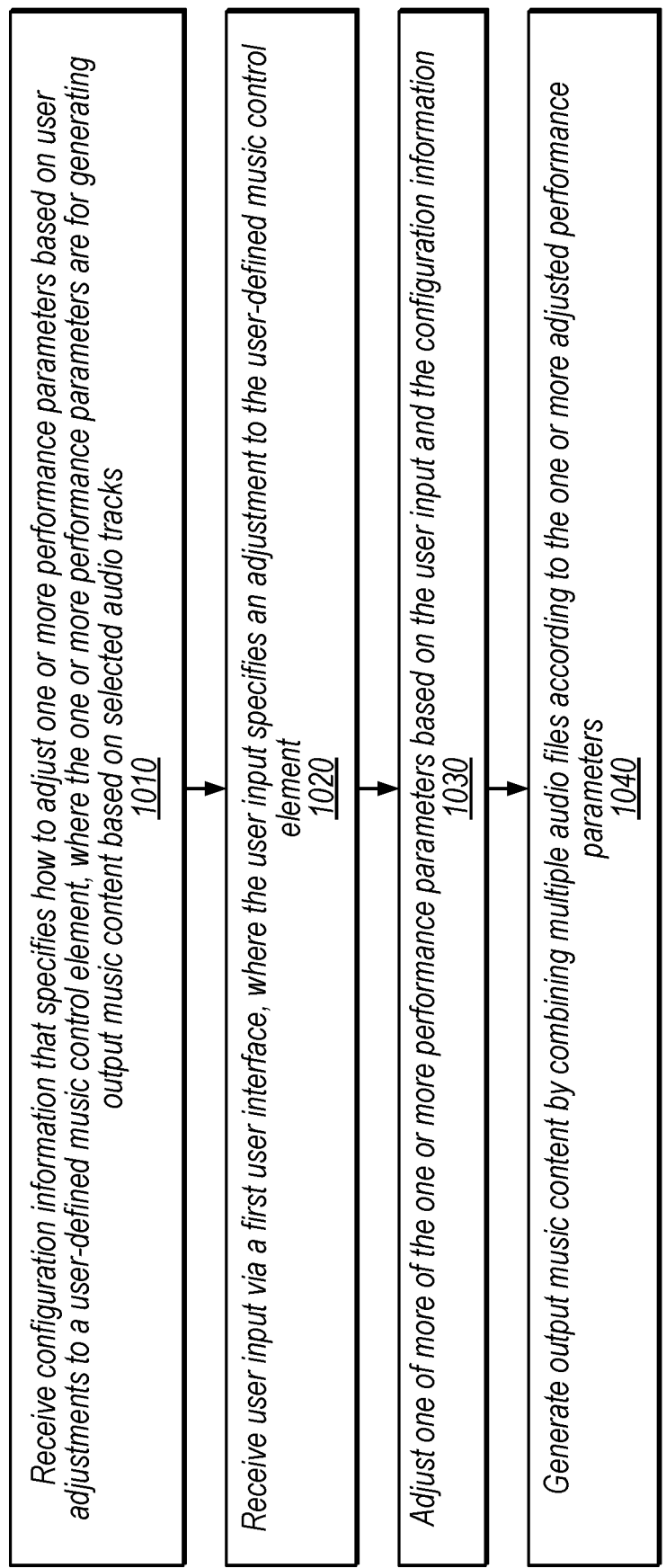

FIGS. 8-10 show details regarding specific embodiments of music generator module 160. Note that although these specific examples are disclosed for purposes of illustration, they are not intended to limit the scope of the present disclosure. In these embodiments, construction of music from loops is performed by a client system, such as a personal computer, mobile device, media device, etc. As used in the discussion of FIGS. 8-10, the term "loops" may be interchangeable with the term "audio files". In general, loops are included in audio files, as described herein. Loops may be divided into professionally curated loop packs, which may be referred to as artist packs. Loops may be analyzed for music properties and the properties may be stored as loop metadata. Audio in constructed tracks may be analyzed (e.g., in real-time) and filtered to mix and master the output stream. Various feedback may be sent to the server, including explicit feedback such as from user interaction with sliders or buttons and implicit feedback, e.g., generated by sensors, based on volume changes, based on listening lengths, environment information, etc. In some embodiments, control inputs have known effects (e.g., to specify target music attributes directly or indirectly) and are used by the composition module.

The following discussion introduces various terms used with reference to FIGS. 8-10. In some embodiments, a loop library is a master library of loops, which may be stored by a server. Each loop may include audio data and metadata that describes the audio data. In some embodiments, a loop package is a subset of the loop library. A loop package may be a pack for a particular artist, for a particular mood, for a particular type of event, etc. Client devices may download loop packs for offline listening or download parts of loop packs on demand, e.g., for online listening.

A generated stream, in some embodiments, is data that specifies the music content that the user hears when they use the music generator system. Note that the actual output audio signals may vary slightly for a given generated stream, e.g., based on capabilities of audio output equipment.

A composition module, in some embodiments, constructs compositions from loops available in a loop package. The composition module may receive loops, loop metadata, and user input as parameters and may be executed by a client device. In some embodiments, the composition module outputs a performance script that is sent to a performance module and one or more machine learning engines. The performance script, in some embodiments, outlines which loops will be played on each track of the generated stream and what effects will be applied to the stream. The performance script may utilize beat-relative timing to represent when events occur. The performance script may also encode effect parameters (e.g., for effects such as reverb, delay, compression, equalization, etc.).

A performance module, in some embodiments, receives a performance script as input and renders it into a generated stream. The performance module may produce a number of tracks specified by the performance script and mix the tracks into a stream (e.g., a stereo stream, although the stream may have various encodings including surround encodings, object-based audio encodings, multi-channel stereo, etc. in various embodiments). In some embodiments, when provided with a particular performance script, the performance module will always produce the same output.

An analytics module, in some embodiments, is a server-implemented module that receives feedback information and configures the composition module (e.g., in real-time, periodically, based on administrator commands, etc.). In some embodiments, the analytics module uses a combination of machine learning techniques to correlate user feedback with performance scripts and loop library metadata.

Figure 6:
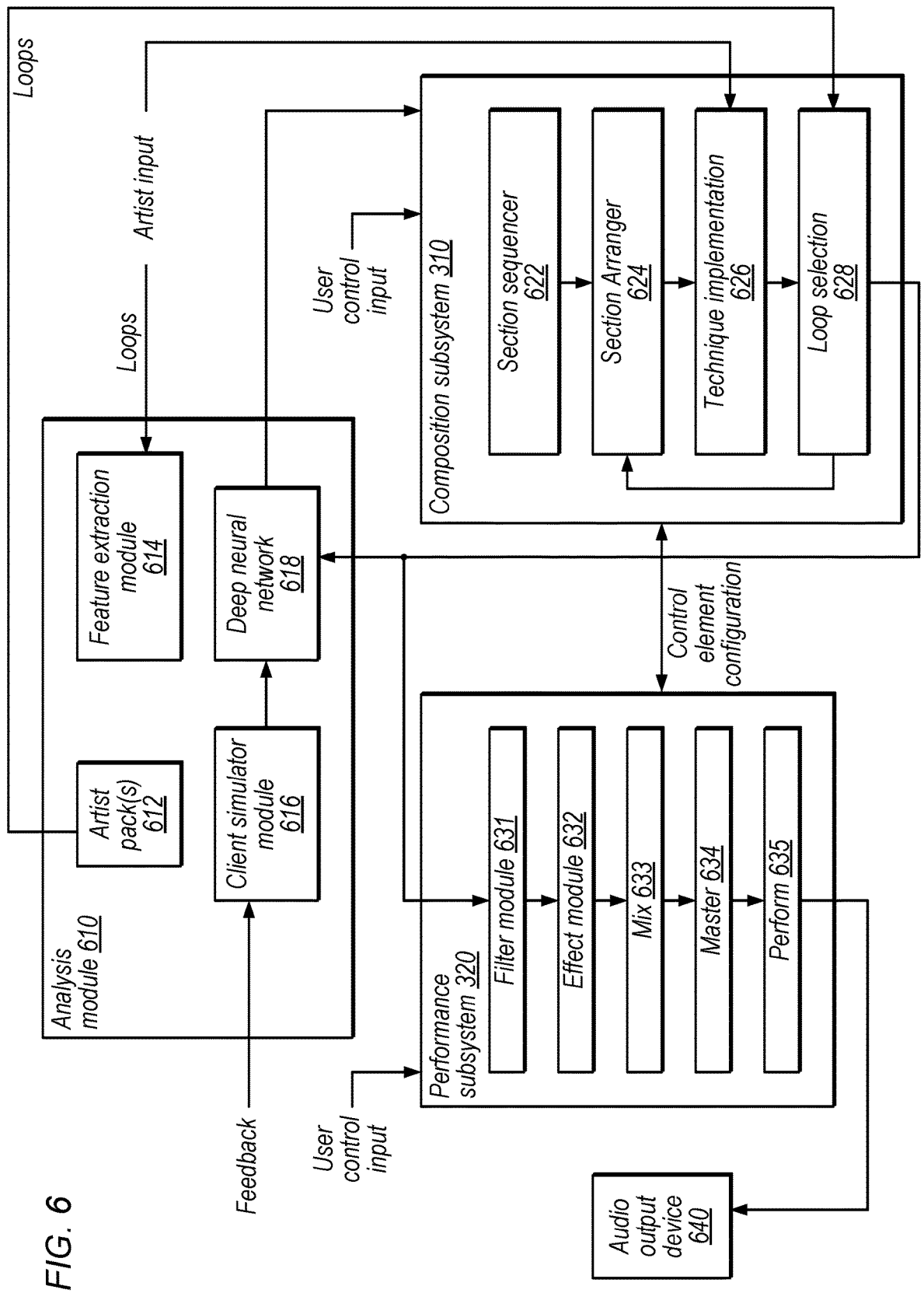
FIG. 6 is a block diagram illustrating an example music generator system that includes analysis and composition modules, according to some embodiments.

FIG. 6 is a block diagram illustrating an example music generator system that includes analysis and composition modules, according to some embodiments. In some embodiments, the system of FIG. 6 is configured to generate a potentially-infinite stream of music with direct user control over the mood and style of music. In the illustrated embodiment, the system includes analysis module 610, composition module 310, performance module 320, and audio output device 640. In some embodiments, analysis module 610 is implemented by a server and composition module 310 and performance module 320 are implemented by one or more client devices. In other embodiments, modules 610, 310, and 320 may all be implemented on a client device or may all be implemented server-side.

Analysis module 610, in the illustrated embodiment, stores one or more artist packs 612 and implements a feature extraction module 614, a client simulator module 616, and a deep neural network 618.

In some embodiments, feature extraction module 614 adds loops to a loop library after analyzing loop audio (although note that some loops may be received with metadata already generated and may not require analysis). For example, raw audio in a format such as way, aiff, or FLAC may be analyzed for quantifiable musical properties such as instrument classification, pitch transcription, beat timings, tempo, file length, and audio amplitude in multiple frequency bins. Analysis module 610 may also store more abstract musical properties or mood descriptions for loops, e.g., based on manual tagging by artists or machine listening. For example, moods may be quantified using multiple discrete categories, with ranges of values for each category for a given loop.

Consider, for example, a loop A that is analyzed to determine that the notes G2, Bb2, and D2 are used, the first beat begins 6 milliseconds into the file, the tempo is 122 bpm, the file is 6483 milliseconds long, and the loop has normalized amplitude values of 0.3, 0.5, 0.7, 0.3, and 0.2 across five frequency bins. The artist may label the loop as "funk genre" with the following mood values:

| Transcendence | Peacefulness | Power | Joy | Sadness | Tension |
|---|---|---|---|---|---|
| HIGH | HIGH | LOW | MEDIUM | NONE | LOW |

Analysis module 610 may store this information in a database and clients may download subsections of the information, e.g., as loop packages. Although artists packs 612 are shown for purposes of illustration, analysis module 610 may provide various types of loop packages to composition module 310.

Client simulator module 616, in the illustrated embodiment, analyzes various types of feedback to provide feedback information in a format supported by deep neural network 618. In the illustrated embodiment, the deep neural network 618 also receives performance scripts generated by composition modules as inputs. In some embodiments, the deep neural network configures the composition module based on these inputs, e.g., to improve correlations between types of generated music output and desired feedback. For example, the deep neural network may periodically push updates to client devices implementing composition module 310. Note that deep neural network 618 is shown for purposes of illustration and may provide strong machine learning performance in disclosed embodiments, but is not intended to limit the scope of the present disclosure. In various embodiments, various types of machine learning techniques may be implemented alone or in various combinations to perform similar functionality. Note that machine learning modules may be used to implement rule sets (e.g., arrangement rules or techniques) directly in some embodiments or may be used to control modules implementing other types of rule sets, e.g., using deep neural network 618 in the illustrated embodiment.

In some embodiments, analysis module 610 generates composition parameters for composition module 310 to improve correlation between desired feedback and use of certain parameters. For example, actual user feedback may be used to adjust composition parameters, e.g., to attempt to reduce negative feedback.

As one example, consider a situation where module 610 discovers a correlation between negative feedback (e.g., explicit low rankings, low volume listening, short listening times, etc.) and compositions that use a high number of layers. In some embodiments, module 610 uses a technique such as backpropagation to determine that adjusting probability parameters used to add more tracks reduces the frequency of this issue. For example, module 610 may predict that reducing a probability parameter by 50% will reduce negative feedback by 8% and may determine to perform the reduction and push updated parameters to the composition module (note that probability parameters are discussed in detail below, but any of various parameters for statistical models may similarly be adjusted).

As another example, consider a situation where module 610 discovers that negative feedback is correlated with the user setting mood control to high tension. A correlation between loops with low tension tags and users asking for high tension may also be found. In this case, module 610 may increase a parameter such that the probability of selecting loops with high tension tags is increased when users ask for high tension music. Thus, the machine learning may be based on various information, including composition outputs, feedback information, user control inputs, etc.

Composition module 310, in the illustrated embodiment, includes a section sequencer 622, section arranger 624, technique implementation module 626, and loop selection module 628. In some embodiments, composition module 310 organizes and constructs sections of the composition based on loop metadata and user control input (e.g., mood control).

Section sequencer 622, in some embodiments, sequences different types of sections. In some embodiments, section sequencer 622 implements a finite state machine to continuously output the next type of section during operation. For example, composition module 310 may be configured to use different types of sections such as an intro, buildup, drop, breakdown, and bridge, as discussed in further detail below with reference to FIG. 10. Further, each section may include multiple subsections that define how the music changes throughout a section, e.g., including a transition-in subsection, a main content subsection, and a transition-out subsection.

Section arranger 624, in some embodiments, constructs subsections according to arranging rules. For example, one rule may specify to transition-in by gradually adding tracks. Another rule may specify to transition-in by gradually increasing gain on a set of tracks. Another rule may specify to chop a vocal loop to create a melody. In some embodiments, the probability of a loop in the loop library being appended to a track is a function of the current position in a section or subsection, loops that overlap in time on another track, and user input parameters such as a mood variable (which may be used to determine target attributes for generated music content). The function may be adjusted, e.g., by adjusting coefficients based on machine learning.

Technique implementation module 310, in some embodiments, is configured to facilitate section arrangement by adding rules, e.g., as specified by an artist or determined by analyzing compositions of a particular artist. A "technique" may describe how a particular artist implements arrangement rules at a technical level. For example, for an arrangement rule that specifies to transition-in by gradually adding tracks, one technique may indicate to add tracks in order of drums, bass, pads, then vocals while another technique may indicate to add tracks in order of bass, pads, vocals, then drums. Similarly, for an arrangement rule that specifies to chop a vocal loop to create a melody a technique may indicate to chop vocals on every second beat and repeat a chopped section of loop twice before moving to the next chopped section.

Loop selection module 628, in the illustrated embodiment, selects loops according to the arrangement rules and techniques, for inclusion in a section-by-section arranger 624. Once sections are complete, corresponding performance scripts may be generated and sent to performance module 320. Performance module 320 may receive performance script portions at various granularities. This may include, for example, an entire performance script for a performance of a certain length, a performance script for each section, a performance script for each sub-section, etc. In some embodiments, arrangement rules, techniques, or loop selection are implemented statistically, e.g., with different approaches used different percentages of the time.

Performance module 320, in the illustrated embodiment, includes filter module 631, effect module 632, mix module 633, master module 634, and perform module 635. In some embodiments, these modules process the performance script and generate music data in a format supported by audio output device 640. The performance script may specify the loops to be played, when they should be played, what effects should be applied by module 632 (e.g., on a per-track or per-subsection basis), what filters should be applied by module 631, etc.

For example, the performance script may specify to apply a low pass filter ramping from 1000 to 20000 Hz from 0 to 5000 milliseconds on a particular track. As another example, the performance script may specify to apply reverb with a 0.2 wet setting from 5000 to 15000 milliseconds on a particular track.

Mix module 633, in some embodiments, is configured to perform automated level control for the tracks being combined. In some embodiments, mix module 633 uses frequency domain analysis of the combined tracks to measure frequencies with too much or too little energy and applies gain to tracks in different frequency bands to even the mix. Master module 634, in some embodiments, is configured to perform multi-band compression, equalization (EQ), or limiting procedures to generate data for final formatting by perform module 635. The embodiment of FIG. 6 may automatically generate various output music content according to user input or other feedback information, while the machine learning techniques may allow for improved user experience over time.

Figure 7:
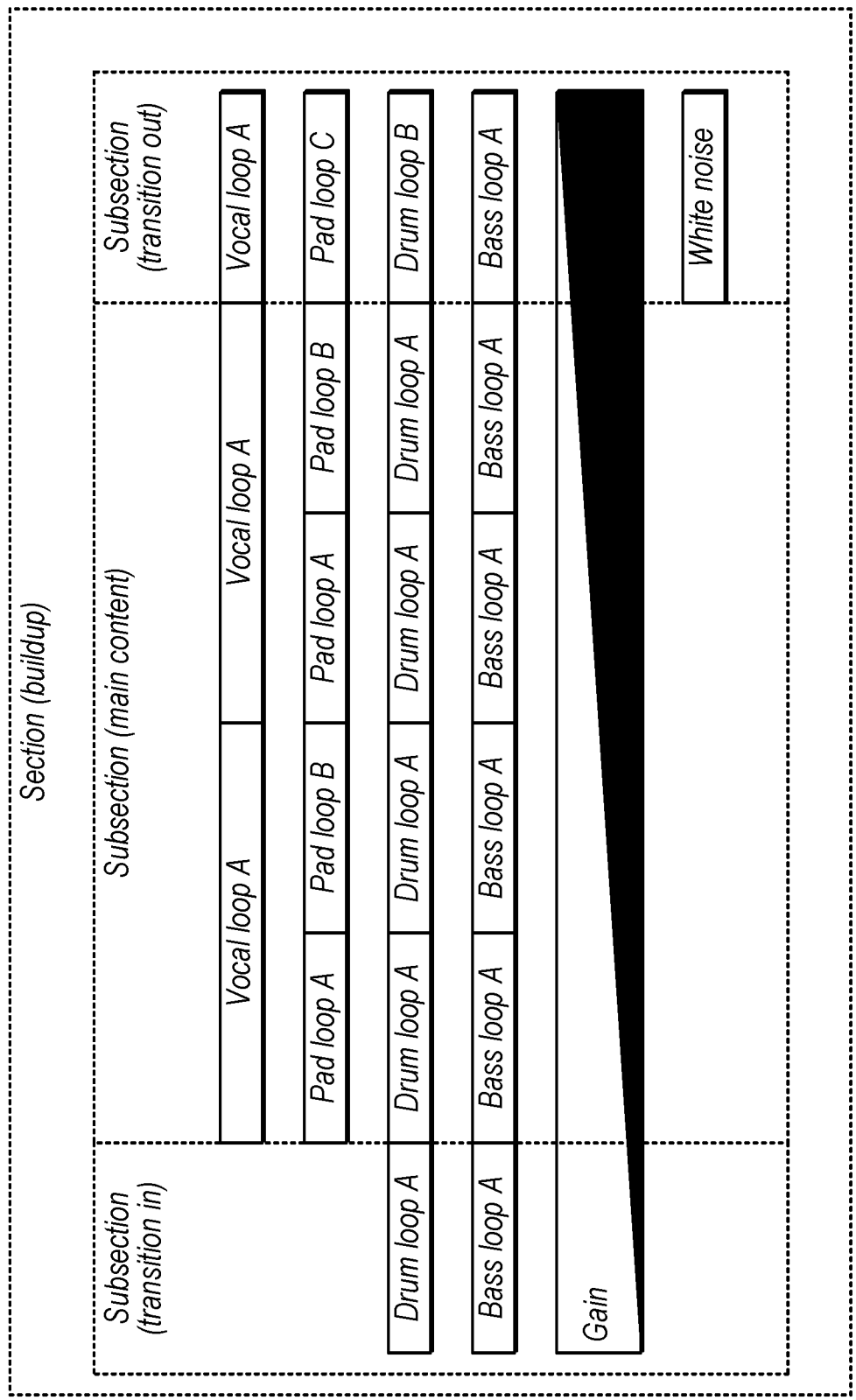
FIG. 7 is a diagram illustrating an example buildup section of music content, according to some embodiments.

FIG. 7 is a diagram illustrating an example buildup section of music content, according to some embodiments. The system of FIG. 6 may compose such a section by applying arranging rules and techniques. In the illustrated example, the buildup section includes three subsections and separate tracks for vocals, pad, drum, bass, and white noise.

The transition in subsection, in the illustrated example, includes a drum loop A, which is also repeated for the main content subsection. The transition in subsection also includes a bass loop A. As shown, the gain for the section begins low and increases linearly throughout the section (although non-linear increases or decreases are contemplated). The main content and transition-out subsection, in the illustrated example, include various vocal, pad, drum, and bass loops. As described above, disclosed techniques for automatically sequencing sections, arranging sections, and implementing techniques may generate near-infinite streams of output music content based on various user-adjustable parameters.

In some embodiments, a computer system displays an interface similar to FIG. 7 and allows artists to specify techniques used to compose sections. For example, artists may create structures such as shown in FIG. 7 which may be parsed into code for the composition module.

FIG. 8 is a diagram illustrating example techniques for arranging sections of music content, according to some embodiments. In the illustrated embodiment, a generated stream 810 includes multiple sections 820 that each include a start subsection 822, development subsection 824, and transition subsection 826. In the illustrated example, multiple types of each section/subsection are show in tables connected via dotted lines. The circular elements, in the illustrated embodiment, are examples of arranging tools, which may further be implemented using specific techniques as discussed below. As shown, various composition decisions may be performed pseudo-randomly according to statistical percentages. For example, the types of subsections, the arranging tools for a particular type or subsection, or the techniques used to implement an arranging tool may be statistically determined.

In the illustrated example, a given section 820 is one of five types: intro, buildup, drop, breakdown, and bridge, each with different functions that control intensity over the section. The state sub-section, in this example, is one of three types: slow build, sudden shift, or minimal, each with different behavior. The development sub-section, in this example, is one of three types, reduce, transform, or augment. The transition sub-section, in this example, is one of three types: collapse, ramp, or hint. The different types of sections and subsections may be selected based on rules or may be pseudo-randomly selected, for example.

In the illustrated example, the behaviors for different subsection types are implemented using one or more arranging tools. For a slow build, in this example, 40% of the time a low pass filter is applied and 80% of the time layers are added. For a transform development sub-section, in this example, 25% of the time loops are chopped. Various additional arranging tools are shown, including one-shot, dropout beat, apply reverb, add pads, add theme, remove layers, and white noise. These examples are included for purposes of illustration and are not intended to limit the scope of the present disclosure. Further, to facilitate illustration, these examples may not be complete (e.g., actual arranging may typically involve a much larger number of arranging rules).

In some embodiments, one or more arranging tools may be implemented using specific techniques (which may be artist specified or determined based on analysis of an artist's content). For example, one-shot may be implemented using sound-effects or vocals, loop chopping may be implemented using stutter or chop-in-half techniques, removing layers may be implemented by removing synth or removing vocals, white noise may be implemented using a ramp or pulse function, etc. In some embodiments, the specific technique selected for a given arranging tool may be selected according to a statistical function (e.g., 30% of the time removing layers may remove synths and 70% of the time it may remove vocals for a given artist). As discussed above, arranging rules or techniques may be determined automatically by analyzing existing compositions, e.g., using machine learning.

Example Method

FIG. 9 is a flow diagram method for controlling a user-specific music control element, according to some embodiments. The method shown in FIG. 9 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 910, in the illustrated embodiment, a computing system receives user input specifying a user-defined music control element.

At 920, in the illustrated embodiment, a computing system receives user input specifying labels for the user-defined music control element for one or more musical compositions.

At 930, in the illustrated embodiment, a computing system trains, based on the labels, one or more machine learning models to: adjust, based on user input to the user-defined music control element, one or more composition parameters for selecting audio tracks to be combined to generate output music content and adjust, based on user input to the user-defined music control element, one or more performance parameters for generating output music content based on selected audio tracks.

At 940, in the illustrated embodiment, a computing system causes output music content to be generated, according to the one or more composition parameters and one or more performance parameters, by combining multiple audio tracks.

In some embodiments, the computing system transmits configuration information based on the one or more machine learning models to a user device, where the configuration information indicates how to adjust performance parameters based on user input to the user-defined music control element. In some embodiments, the computing system adjusts, according to the one or more machine learning models, one or more composition parameters based on user input to the user-defined music control element. In some embodiments, a user device of the computing system adjusts, according to the configuration information, one or more composition parameters based on user input to the user-defined music control element.

In some embodiments, the transmission uses delimited strings to specify a data target, wherein the method further comprising forming strings based on a data structure with pointers to offsets in a string, wherein the string formation includes prepending or appending to an existing string.

In some embodiments, the training is further based on user input that explicitly specifies relationships between composition parameters and user input to the user-defined music control element.

In some embodiments, the one or more composition parameters includes parameters for: building, sustaining, and reducing tension between musical sections, enabling or disabling audio file categories, adjusting one or more of the following music aspects for one or more audio file categories: volume, reverb amount, delay punch probability, and delay wetness, etc. In some embodiments, the one or more performance parameters include at least one of the following types of parameters: filter parameters, effects parameters, and mix parameters.

FIG. 10 is a flow diagram method for generating music content based on a user-specific music control element, according to some embodiments. The method shown in FIG. 10 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 1010, in the illustrated embodiment, a computing system receives configuration information, where the configuration information specifies how to adjust one or more performance parameters based on user adjustments to a user-defined music control element and where the one or more performance parameters are for generating output music content based on selected audio tracks.

At 1020, in the illustrated embodiment, a computing system receives user input via a first user interface, where the user input specifies an adjustment to the user-defined music control element.

At 1030, in the illustrated embodiment, a computing system adjusts one of more of the one or more performance parameters based on the user input and the configuration information.

At 1040, in the illustrated embodiment, a computing system generates output music content by combining multiple audio files according to the one or more adjusted performance parameters.

In some embodiments, the computing system receives composition control information (e.g., a composition script) that indicates the multiple audio files to be combined and indicates transitions between musical sections. In some embodiments, the composition control information is generated based on user input (e.g., by an artist via an artist user interface or an end-user via the first user interface) specifying an adjustment to the user-defined music control element.

In some embodiments, the user-defined music control element is defined via a second user interface generated by a server system that transmitted the configuration information. In some embodiments, the user-defined music control element is defined by a different user than a user that provides the user input via the first user interface.

In some embodiments, the computing system parses the configuration information using pointers to locations within a delimited string that indicates a target of the configuration information.

The present disclosure includes references to an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to"

perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. A method, comprising:
   receiving, by a computing system, user input specifying a user-defined music control element;
   receiving, by the computing system, user input specifying labels for the user-defined music control element applied to one or more previous musical compositions accessed by the computing system;

training, by the computing system based on the labels, one or more machine learning models to:

adjust, based on user input to the user-defined music control element, one or more composition parameters for selecting audio tracks from a set of stored audio tracks to be combined to generate output music content; and adjust, based on user input to the user-defined music control element, one or more performance parameters for generating output music content; and cause output music content to be generated, according to the one or more performance parameters, by combining multiple audio tracks that have been selected from the set of stored audio tracks according to the one or more composition parameters.

2. The method of claim 1, where the computing system is a server system, the method further comprising:

transmitting configuration information based on the one or more machine learning models to a user device, wherein the configuration information indicates how to adjust performance parameters based on user input to the user-defined music control element.

3. The method of claim 2, further comprising:

adjusting, by the computing system according to the one or more machine learning models, the one or more composition parameters based on user input to the user-defined music control element.

4. The method of claim 2, further comprising:

adjusting, by the user device according to the configuration information, the one or more composition parameters at the user device based on user input to the user-defined music control element received at the user device.

5. The method of claim 2, wherein the transmitting uses delimited strings to specify a data target, wherein the method further comprising forming strings based on a data structure with pointers to offsets in a string, wherein the string formation includes prepending or appending to an existing string.

6. The method of claim 1, wherein the training is further based on user input that explicitly specifies relationships between the one or more composition parameters and the user input to the user-defined music control element.

7. The method of claim 1, wherein the one or more composition parameters include parameters for:

building, sustaining, and reducing tension between musical sections.

8. The method of claim 7, wherein the one or more composition parameters include parameters for:

enabling or disabling audio file categories; and adjusting one or more of the following music aspects for one or more audio file categories: volume, reverb amount, delay punch probability, and delay wetness.

9. The method of claim 1, wherein the one or more performance parameters include at least one of the following types of parameters:

filter parameters, effects parameters, and mix parameters.

10. A non-transitory computer-readable medium having instructions stored thereon that are executable by a computing device to perform operations comprising:

receiving configuration information from a server system, wherein the configuration information specifies how to adjust one or more performance parameters based on user adjustments to a user-defined music control element, wherein the one or more performance parameters are for generating output music content;

receiving user input via a first user interface, wherein the user input specifies an adjustment to the user-defined music control element;

adjusting one or more of the one or more performance parameters based on the user input and the configuration information; and generating output music content by combining, according to the one or more adjusted performance parameters, multiple audio tracks selected from a set of stored audio tracks.

11. The non-transitory computer-readable medium of claim 10, further comprising receiving, from the server system, composition control information that indicates the multiple audio tracks to be combined and indicates transitions between musical sections found in the multiple audio tracks.

12. The non-transitory computer-readable medium of claim 11, wherein the composition control information is generated based on user input specifying an adjustment to the user-defined music control element.

13. The non-transitory computer-readable medium of claim 10, wherein the user-defined music control element is defined via a second user interface generated by the server system that transmitted the configuration information.

14. The non-transitory computer-readable medium of claim 13, wherein the user-defined music control element is defined by a different user than a user that provides the user input via the first user interface.

15. The non-transitory computer-readable medium of claim 10, further comprising:

parsing the configuration information using pointers to locations within a delimited string that indicates a target of the configuration information.

16. An apparatus, comprising:

one or more processors configured to:

receive configuration information from a server system, wherein the configuration information specifies how to adjust one or more performance parameters based on user adjustments to a user-defined music control element, wherein the one or more performance parameters are for generating output music content;

receive user input via a first user interface, wherein the user input specifies an adjustment to the user-defined music control element;

adjust one or more of the one or more performance parameters based on the user input and the configuration information; and generate output music content by combining, according to the one or more adjusted performance parameters, multiple audio tracks selected from a set of stored audio tracks.

17. The apparatus of claim 16, wherein the one or more processors are further configured to:

receive, from the server system, composition control information that indicates the multiple audio files to be combined and indicates transitions between musical sections found in the multiple audio tracks, wherein the composition control information is generated by a machine learning model based on user input specifying an adjustment to the user-defined music control element.

18. The apparatus of claim 16, wherein the user-defined music control element is defined via a second user interface generated by the server system that transmitted the configuration information.

19. The apparatus of claim 16, wherein the one or more processors are further configured to:
    parse the configuration information using pointers to locations within a delimited string that indicates a target of the configuration information.

20. The apparatus of claim 16, wherein the apparatus is a mobile device that includes a display configured to display the first user interface and a wireless radio configured to connect to a wireless network.

* * * * *